United States Patent
Wakabayashi et al.

(10) Patent No.: US 6,560,411 B2
(45) Date of Patent: May 6, 2003

(54) MECHANICAL POWER SWITCHING APPARATUS AND CAMERA

(76) Inventors: Hiroshi Wakabayashi, 204, Yamamoto-cho 5 chome, Naka-ku, Yokohama-shi, Kanagawa-ken (JP); Hidefumi Obo, 4-29, Namiki 4-chome, Kawaguchi-shi, Saitama-ken (JP)

(*) Notice: Subject to any disclaimer, the term of this patent is extended or adjusted under 35 U.S.C. 154(b) by 0 days.

(21) Appl. No.: 09/862,819

(22) Filed: May 22, 2001

(65) Prior Publication Data

US 2001/0051044 A1 Dec. 13, 2001

(30) Foreign Application Priority Data

May 30, 2000 (JP) .......................................... 2000-159498

(51) Int. Cl.[7] .............................. G03B 1/00; G03B 17/00
(52) U.S. Cl. ........................ 396/85; 396/132; 396/413; 396/418
(58) Field of Search .......................... 396/85, 132, 418, 396/413

(56) References Cited

U.S. PATENT DOCUMENTS

| | | | | |
|---|---|---|---|---|
| 4,903,059 A | * | 2/1990 | Onda et al. ................. | 396/413 |
| 5,365,301 A | * | 11/1994 | Sugita et al. ................ | 396/144 |
| 5,625,852 A | | 4/1997 | Wada et al. | |
| 6,106,164 A | * | 8/2000 | Katagiri ....................... | 396/413 |
| 6,175,694 B1 | * | 1/2001 | Ichino et al. ................ | 396/418 |

* cited by examiner

*Primary Examiner*—Della J Rutledge
(74) *Attorney, Agent, or Firm*—Frishauf, Holtz, Goodman & Chick, P.C.

(57) ABSTRACT

If a sun gear is rotated in the clockwise direction, a planetary arm is also rotated in the clockwise direction so as to permit the planetary gear and a transmission gear to operatively mesh. If the sun gear is then rotated in the clockwise direction, a cam plate driven by a pin is rotated in the counterclockwise direction. A first engaging lever is rotated in the clockwise direction by a cam mounted to the rotary edge of the cam plate to release the engagement of the rotary edge of the planetary arm. If the sun gear is rotated in the counterclockwise direction, the planetary arm is rotated in the counterclockwise direction to permit the planetary gear to mesh with an idle gear. The planetary arm is engaged with a second engaging lever to maintain the meshed state between the planetary gear and the idle gear. If the sun gear is then rotated in the counterclockwise direction, a photographic film is wound up within a cartridge.

14 Claims, 17 Drawing Sheets

MECHANICAL POWER SWITCHING APPARATUS AND CAMERA

BACKGROUND OF THE INVENTION

1. Field of the Invention

The present invention relates to a mechanical power switching apparatus, particularly, to a mechanical power switching apparatus capable of supplying a mechanical power for movement of an optical element constituting a variable focal length optical system, hereinafter referred to as "zoom optical system", and to one or more driving systems for other uses by switching the transmission of the mechanical power generated from a single driving source.

2. Description of the Related Art

Known is, for example, a full automatic camera having an electrically movable zoom lens mounted therein and automatically performing all the operations including the distance measurement, the light measurement, the focus adjustment, the exposure amount control, and the film feeding. A motor for driving a zoom lens barrel and another motor for the film feeding are housed in such a camera.

It should be noted, however, that, in the full automatic camera of the type described above, it is necessary to ensure the space for housing a plurality of motors, which makes it difficult to miniaturize the camera and to lower the manufacturing cost of the camera. In addition, many control circuits and power transistors are required for independently controlling these plural motors, which also makes it difficult to miniaturize the camera and to lower the manufacturing cost of the camera.

BRIEF SUMMARY OF THE INVENTION

A first object of the present invention is to provide a mechanical power switching apparatus capable of supplying the mechanical power generated from a single driving source to a power zoom mechanism for moving optical elements constituting a zoom optical system and also capable of switching the mechanical power supply to one or more driving devices for other uses.

A second object of the present invention is to provide a camera capable of switching the supply of a mechanical power generated from a single actuator to a lens barrel for a zoom motion of the photographing optical system and to one or more driving devices for other uses.

According to a first aspect of the present invention, there is provided a mechanical power switching apparatus, comprising a zoom optical system in which the focal length is changed in accordance with movement of optical elements; a holding mechanism for movably holding said optical elements; a driving source for supplying a mechanical power to said holding mechanism; and a transmission switching mechanism for moving said optical elements, for breaking the transmission of said mechanical power from said driving source to said holding device during the course of change in the focal length of said zoom optical system from the value of 1 to another value, and for transmitting said mechanical power to a driving device for another use differing from the movement of said optical elements.

According to a second aspect of the present invention, there is provided a camera, comprising a zoom photographing optical system in which the focal length is changed in accordance with movement of optical elements; a lens barrel movably holding said optical elements; an actuator for supplying a mechanical power to said lens barrel; and a transmission switching mechanism for moving said optical elements, for breaking the transmission of said mechanical power from said actuator to said lens barrel in accordance with the change in the direction of the mechanical power generated from said actuator during the course of the change in the focal length of said zoom photographing optical system from the value of 1 to another value, and for transmitting said mechanical power to a driving device for another use differing from the movement of said optical elements.

According to the present invention, the mechanical power generated from the driving source can be transmitted to a driving device for another use by changing the direction of the mechanical power generated from the driving source during the course of change in the focal length of the zoom optical system from the value of 1 to another value. Since it is unnecessary to use a plunger or another actuator, it is possible to miniaturize the mechanical power switching apparatus and to manufacture the apparatus with lower manufacturing cost.

DETAILED DESCRIPTION OF THE INVENTION

One embodiment of the present invention will now be described with reference to the accompanying drawings.

Figure 1:
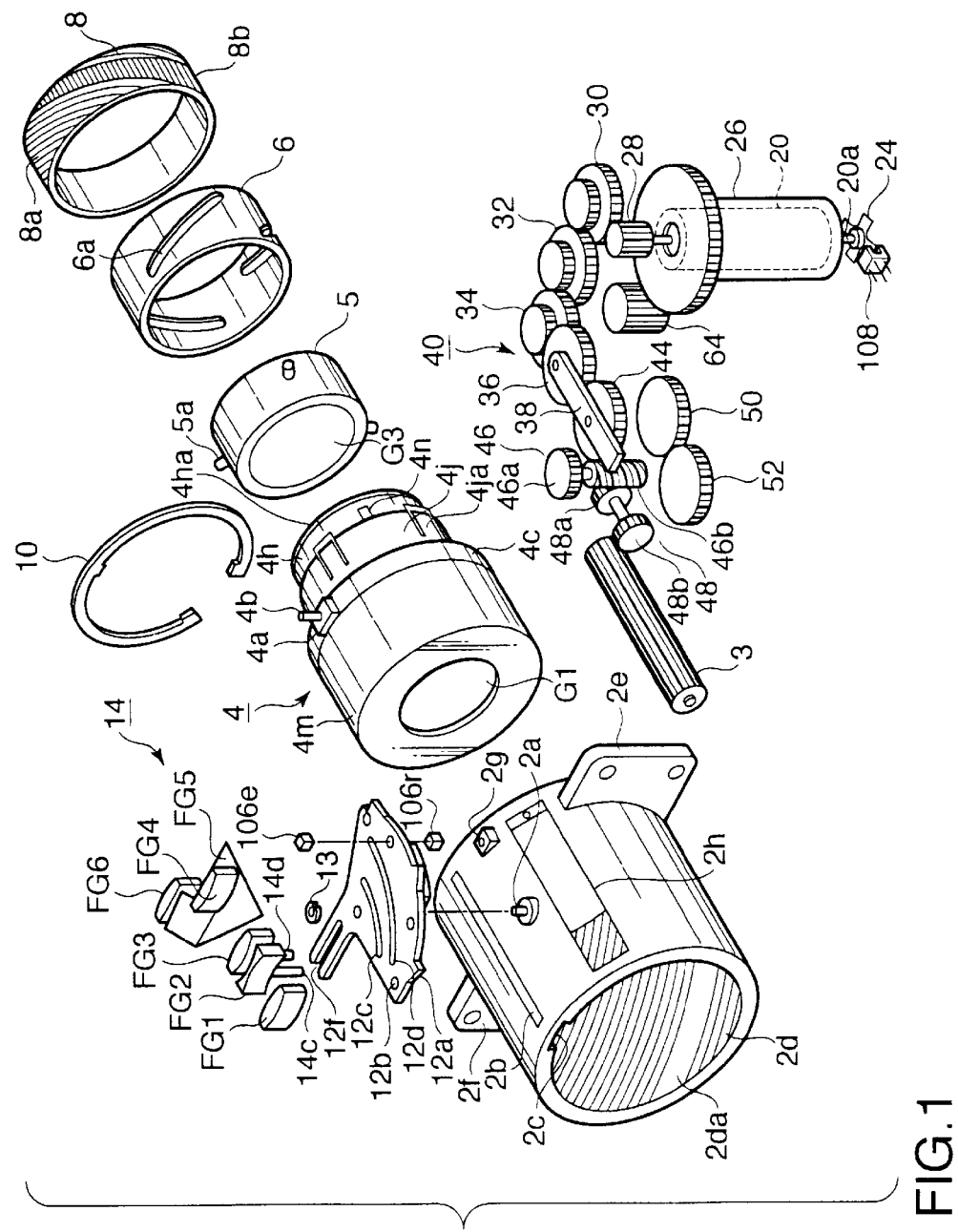
FIG. 1 is a drawing showing in a dismantled fashion a gist portion of a camera in which a mechanical power switching apparatus according to one embodiment of the present invention is incorporated.
Figure 2:
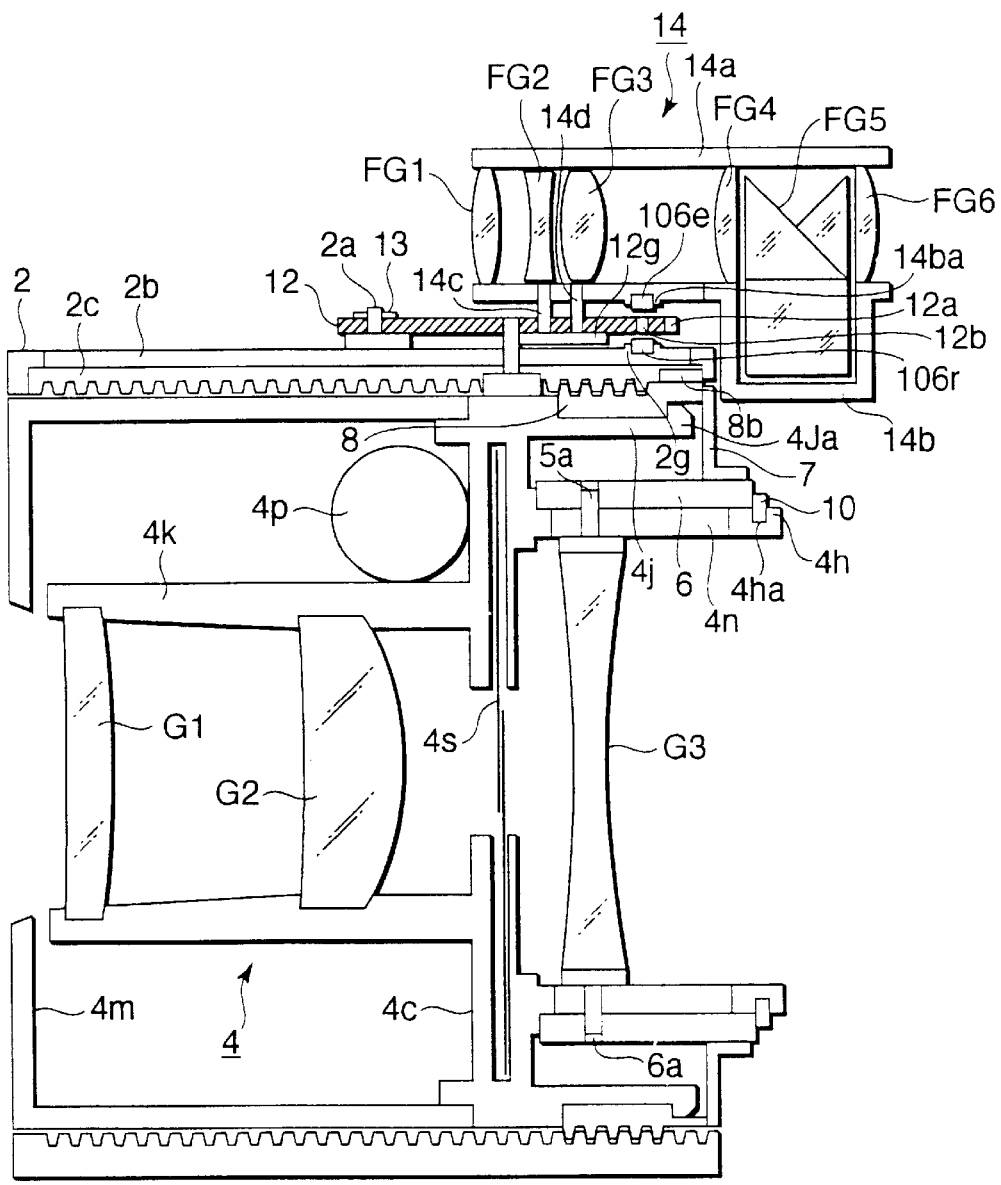
FIG. 2 is a vertical cross sectional view showing a lens barrel portion of a camera in which a mechanical power switching apparatus according to one embodiment of the present invention is incorporated.

FIG. 1 schematically shows the construction of a lens barrel of a camera in which a mechanical power switching apparatus of the present invention is incorporated. The lens barrel shown in FIG. 1 is a zoom lens barrel. A plurality of lens elements G1, G2 and G3 collectively constituting a photographing optical system are held within the zoom lens barrel. Incidentally, the zoom lens element G2, which is not shown in FIG. 1, is shown in FIG. 2. The focal length of the entire photographing optical system can be changed by changing the relative distances among these plural lenses G1, G2 and G3 in the direction of the optical axis. FIG. 2 is a vertical cross sectional view showing the lens barrel section noted above. In the following description, the direction toward an object, i.e., the left side in FIG. 2, is called forward and the direction toward the image, i.e., the right side in FIG. 2, is called rearward.

Flange sections 2e and 2f are mounted to a stationary barrel 2 such that the stationary barrel 2 is fixed to a camera body (not shown) via these flange sections 2e and 2f. A helicoid screw (female screw) 2d having a large number of turns of a thread is formed on the inner circumferential surface of the stationary barrel 2. Also, a spiral groove 2da is formed on the inner circumferential surface of the stationary barrel 2 in a manner to partly remove the ridges of the helicoid screw 2d.

An angular groove 2c extending in a direction parallel to the axis of the barrel is formed on the inner surface of the stationary barrel 2. A long hole 2b extending in a direction substantially parallel to the extending direction of the angular groove 2c is formed in an inner part of the angular groove 2c, i.e., on the upper side in FIG. 2.

A shaft 2a and a seat 2g are formed in an upper portion of the stationary barrel 2. The shaft 2a is inserted into a cam plate 12 and a stop ring 13 is fixed to the shaft 2a. The cam plate 12 is rotatable about the shaft 2a. A light receiving element 106r, which will be described herein later, is fixed to the seat 2g.

A through-hole 2h extending in a direction parallel to the axis of the barrel is formed in the stationary barrel 2, and a gear 3 is rotatably incorporated in the through-hole 2h. The gear 3 is a spur gear having a large tooth width, compared with the tooth thickness.

A movable barrel 4 will now be described. The movable barrel 4 is formed by combination of a shutter base 4c and an outer barrel 4m. A plurality of shutter blades 4s are incorporated in the shutter base 4c. These shutter blades 4s are opened or closed by an actuator 4p. A lens holding barrel 4k is formed on the front side (on the side of the object) of the shutter base 4c, and the lenses G1 and G2 forming a front group of lenses are held and fixed by the lens holding barrel 4k. A guide barrel 4h is formed on the rear side of the shutter base 4c. Three guide grooves 4n extending in a direction parallel to the axis of the barrel are formed in the guide barrel 4h. These guide grooves 4n are positioned to equally divide the circumferential surface of the guide barrel 4h into three sections.

A projecting portion 4a, which is engaged with the angular groove 2c formed inside the stationary barrel 2, is formed in an upper portion of the movable barrel 4, and a pin 4b is formed in the projecting portion 4a. The projecting portion 4a serves to prevent the movable barrel 4 from being rotated about the optical axis of the photographing optical system and plays the role of a straight guide that permits the movable barrel 4 to be movable in the direction of the optical axis. The pin 4b extends through the long hole 2b formed in the stationary barrel 2, and projects into an upper portion of the stationary barrel 2 so as to be engaged with a groove 12f formed in the cam plate 12.

A movable frame 5 serving to hold the rear group lens G3 is incorporated inside the guide barrel 4h such that the frame 5 is movable in the direction of the optical axis of the photographing optical system. A circumferential groove 4ha is formed rearward of the guide barrel 4h in the outer circumferential portion. Also, a cam barrel 6 is incorporated in the outer circumferential surface of the guide barrel 4h in a manner to be rotatable about the optical axis of the photographing optical system, and a stop ring 10 is fixed to the circumferential groove 4ha.

Three cam grooves 6a are formed substantially equidistantly, i.e., about 120° apart from each other, in a cam barrel 6. Also, three cam pins 5a are fixed at a substantially equal angular distance to the outer circumferential portion of a movable frame 5. These cam pins 5a are engaged with the guide groove 4n and the cam groove 6a.

A barrel portion 4j is formed rearward of the movable barrel 4 in a manner to surround the outer circumferential surface of the guide barrel 4h. A plurality of jaw portions 4ja are formed in the barrel portion 4j. Also, a gear helicoid 8 is incorporated in the barrel portion 4j. Where the gear helicoid 8 is incorporated in the barrel portion 4j, the jaw portions 4ja are elastically deformed toward the inner portion of the barrel portion 4j. If the gear helicoid 8 is incorporated deep into the inside, the jaw portions 4ja are restored so as to be engaged with the rear end portion of the gear helicoid 8. In this fashion, the gear helicoid 8 is incorporated rotatable relative to the barrel portion 4j. Also, the gear helicoid 8 is prevented from being withdrawn rearward by the function of the jaw portions 4ja.

The gear helicoid 8 will now be described. As shown in FIG. 1, a helicoid screw (male screw) 8a having a large number of turns of a thread, which are engaged with the female screw 2d formed in the inner circumferential surface of the stationary barrel 2, are formed on the outer circumferential surface of the gear helicoid 8. Also, a gear 8b is formed on the outer circumferential surface of the gear helicoid 8 in a manner to remove partly the helicoid screw 8a noted above and to spirally arrange the teeth of a spur gear. The gear 8b is meshed with the gear 3 referred to previously.

As shown in FIG. 2, the gear helicoid 8 is joined to the cam barrel 6 via a connecting member 7. The gear helicoid 8 meshed with the gear 3 is rotated in accordance with rotation of the gear 3 so as to permit the gear helicoid 8 to be moved in the direction of the optical axis of the photographing system under the functions of the helicoid screws 2d and 8a. The gear helicoid 8 and the cam barrel 6 are rotated integral. In this case, since the projecting portion 4a of the movable barrel 4 is engaged with the angular groove 2c, the movable barrel 4 is moved straight along the optical axis without being rotated about the optical axis of the photographing optical system. Also, a mutual rotation takes place between the guide barrel 4h that is moved straight together with the movable barrel 4 and the cam barrel 6 performing a spiral rotating operation together with the gear helicoid 8. As a result, the movable frame 5 is moved in the extending direction of the optical axis of the photographing optical system relative to the movable barrel 4. In other words, the front group lenses G1, G2 and the rear group lens G3 are moved back and forth in the extending direction of the optical axis of the photographing optical system while changing the mutual distance between the front group lenses G1, G2 and the rear group lens G3 so as to perform the zooming operation.

In accordance with the above-noted movement of the movable barrel 4 in the back and forth directions, the pin 4b is also moved back and forth. Also, the cam plate 12 is interlocked with the movement of the pin 4b so as to be rotated about the shaft 2a. As shown in FIG. 1, the cam plate 12 is substantially sector-shaped. Two cam grooves 12c and 12d are formed in the cam plate 12. Also, three cams 12a, which are shaped like ratchet teeth, are formed a predetermined angular distance apart from each other on the outer circumferential surface of the cam plate 12. Further, four through-holes 12b are formed in the vicinity of the outer circumferential surface of the cam plate 12.

A finder unit 14 will now be described. As shown in FIG. 2, three lenses FG1, FG4, FG6 and a single Porro prism FG5 are fixed between an upper case 14a and a lower case 14b within the finder unit 14. Also, two lenses FG2 and FG3 are held movable in the front-rear direction within the finder unit 14. The finder unit 14 is fixed to the stationary barrel 2 by a screw (not shown).

Pins 14c and 14d are formed below the lenses FG2 and FG3, respectively. These pins 14c and 14d are engaged with the cam grooves 12c and 12d, respectively, which are formed in the cam plate 12. A seat 14ba is formed in the bottom portion of the lower case 14b, and a light emitting element 106e is fixed to the seat 14ba. As shown in FIG. 2, the light emitting element 106e and the light receiving element 106r are positioned to face each other with the cam plate 12 interposed therebetween. When the cam plate 12 is rotated, it is possible to monitor the output signal generated from the light receiving element 106r, said output signal indicating that the through-hole 12b made in the cam plate 12 is positioned in the mutually facing position between the light emitting element 106e and the light receiving element 106r, so as to detect the position of the cam plate 12. It follows that it is possible to detect the rough angular position of the cam plate 12. Also, since the position in the front-rear direction of the movable barrel 4 strictly corresponds to the rotary angular position of the cam plate 12, it is possible to know the position in the front-rear direction of the movable barrel 4, i.e., the position of the zoom lens barrel, on the basis of the signal generated from the light receiving element 106r.

In the embodiment of the present invention, it is possible to detect the four positions of the zoom lens barrel by utilizing the four through-holes 12b made in the cam plate 12, i.e., the four positions consisting of the lens stowed position, the wide edge position (position at widest angle), hereinafter referred to as "wide position", the intermediate focal length position (hereinafter referred to as "middle position"), and the tele edge position (position at the narrowest angle), hereinafter referred to as "tele position". In this embodiment, the number of these positions is set at 4 for simplifying the description. However, it is possible to increase or decrease appropriately the number of these positions depending on the specification of the camera.

The driving system of the camera according to this embodiment will now be described.

The driving system comprises a single actuator for electrically driving the zoom lens barrel described above and a transmission switching mechanism for the switching of the driving force generated from the actuator for the wind-up of a film, for the rewinding, and for the driving of the zoom lens barrel.

An electromagnetic driving motor is used in the example described below as the actuator. However, it is also possible to use another actuator such as an ultrasonic wave motor.

Figure 3:
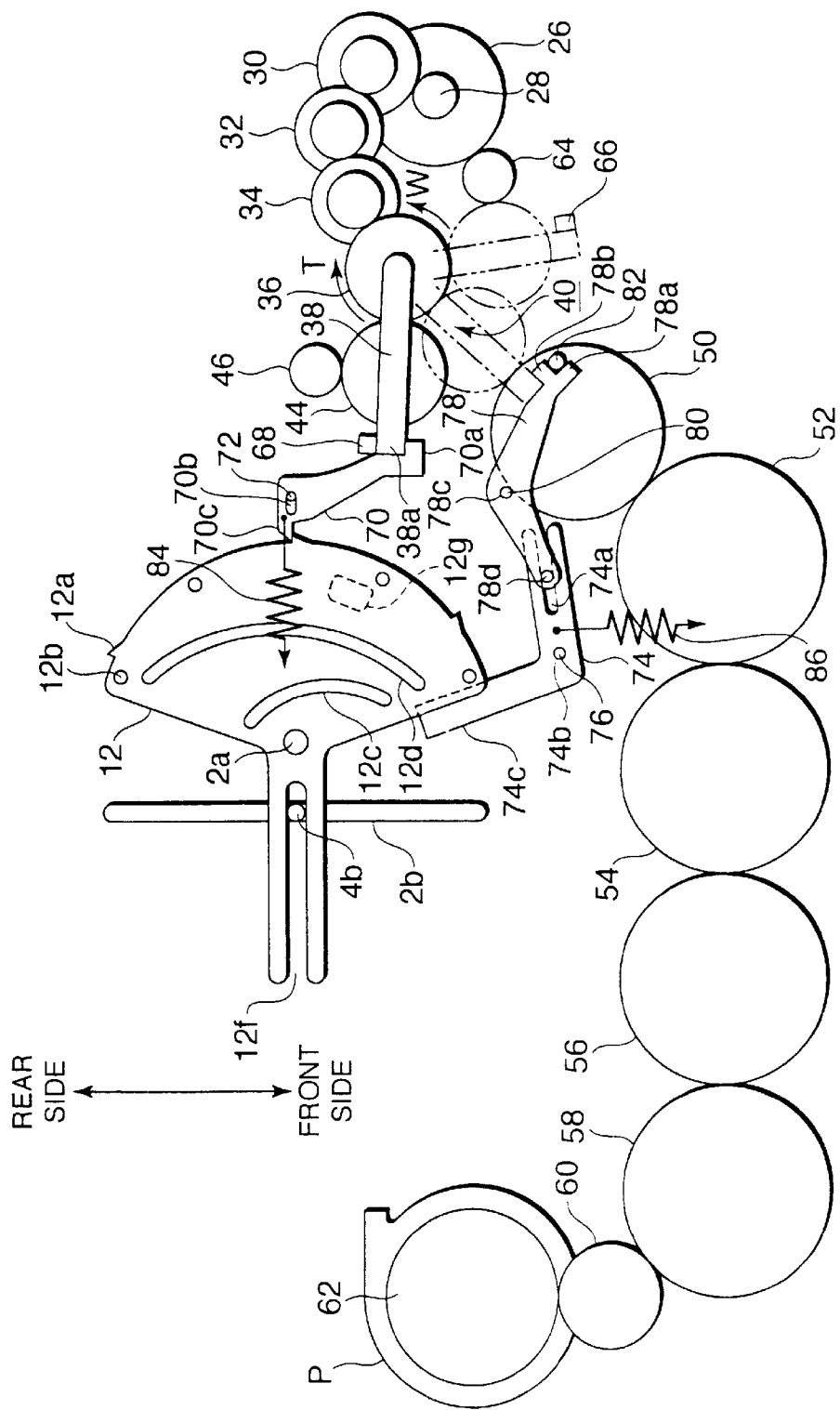
FIG. 3 is a drawing showing the construction of a mechanical power switching apparatus according to one embodiment of the present invention.

The driving system including the transmission switching mechanism noted above will now be described with reference to FIGS. 1 and 3. FIG. 3 shows in a planar fashion the construction of a mechanical power switching mechanism according to one embodiment of the present invention. The downward direction in FIG. 3 corresponds to the forward direction of the photographing optical system.

A motor 20 is arranged within an inner space of a spool 26 for winding up a photographic film. A pinion gear 28 is fixed to one end of a rotary shaft 20a of the motor 20, and an encoder plate 24 is fixed to the other end portion of the rotary shaft 20a. A plurality of windmill-like blades are mounted to the encoder plate 24. It is possible to detect the rotating speed or amount of the motor 20 by monitoring the change in the output signal from a photo-interrupter 108 when the blade passes through the optical path of the photo-interrupter 108. Incidentally, it is possible to omit the encoder plate 24 and the photo-interrupter 108 by using a stepping motor as the motor 20 because, in the case of using a stepping motor, the rotating speed or amount of the motor can be controlled by counting the number of pulses of the voltage applied in a pulse-like fashion.

It is possible to grasp the focal length of the photographing optical system (i.e., the position in the front-rear direction of the movable frame 4) and the angular position of the cam plate 12 by using the signal generated from the light receiving element 106r described previously and the signal generated from the photo-interrupter 108. Incidentally, it is possible to eliminate the light emitting element 106e and the light receiving element 106r and to count the accumulated value of the pulse signals generated from the photo-interrupter 108. Alternatively, it is possible to arrange a so-called "encoder substrate" and a brush sliding on the substrate so as to permit the brush to be interlocked with the movement of the cam plate 12 or the movable barrel 4. In this case, it is possible to grasp the focal length of the photographing optical system and the angular position of the cam plate 12 by detecting the signal generated from the brush or from the encoder substrate. In addition, it is possible to grasp the absolute values of the focal length of the photographing optical system and the angular position of the cam plate 12 even where a battery is withdrawn during the operation by using an absolute type encoder pattern.

The driving force generated from the motor 20 is transmitted to a known type of a planetary gear mechanism 40 via decelerating gears 30, 32, and 34. The planetary gear mechanism 40 comprises, for example, a sun gear 36, a planetary gear 44, a planetary arm 38 joining these sun gear 36 and the planetary gear 44, and a friction spring (not shown). In accordance with rotation of the sun gear 36 in the clockwise direction or in the counterclockwise direction, the planetary gear 44 is rotated about the sun gear 36. Depending on the rotating position of the planetary arm 38, the planetary gear 44 is meshed with any of a transmission gear 46, an idle gear 50 and another idle gear 64, as shown in FIG. 3. In FIG. 3, the meshing state of the planetary gear 44 with the transmission gear 46 is denoted by a solid line, and meshing state of the planetary gear 44 with another gear is denoted by a two dots-and-dash line. Stoppers 68 and 66 are stationary members mounted for regulating the rotation of the planetary arm 38 in the clockwise direction and the counterclockwise direction.

As shown in FIG. 1, the transmission gear 46 comprises a spur gear 46a and worm gears 46b which are formed coaxial. The worm gears 46b are meshed with a worm wheel 48a of the next stage transmission gear 48. The transmission gear 48 comprises the worm wheel 48a and a spur gear 48b, which are formed coaxial, and the spur gear 48b is meshed with the gear 3. If the sun gear 36 is rotated in the clockwise/counterclockwise direction in FIG. 3 under the state that the planetary gear 44 is meshed with the spur gear 46a of the transmission gear 46, the zoom lens barrel performs the zoom up/zoom down operation.

If the sun gear 36 is rotated in the counterclockwise direction in FIG. 3 under the state that the idle gear 50 is meshed with the planetary gear 44, the mechanical power is transmitted to a fork gear 62 via idle gears 50, 52, 54, 56, 58 and 60, with the result that the fork gear 62 is rotated in the counterclockwise direction in FIG. 3. A two-branched fork member (not shown) is joined to the fork gear 62 in a direction toward the back surface of the paper sheet. The fork member is meshed with the film winding reel (not shown) of the cartridge P. If the fork gear 62 is rotated in the counterclockwise direction, the photographic film is taken into the cartridge P.

If the sun gear 36 is rotated in the counterclockwise direction in FIG. 3 under the state that the idle gear 64 is meshed with the planetary gear 44, the mechanical power is transmitted to the spool 26 via the idle gear 64, with the result that the spool 26 is rotated in the clockwise direction in FIG. 3. If the spool 26 is rotated in the clockwise direction, the photographic film is wound up about the spool 26.

The transmission switching mechanism further comprises a first engaging lever 70, a second engaging lever 78 and a joining lever 74.

The first engaging lever 70 comprises a hook portion 70c, a planetary arm engaging portion 70a, and a long hole 70b. A spring 84 is attached to the first engaging lever 70 under the state that the long hole 70b is engaged with a rotary shaft 72 such that the first engaging lever 70 is kept urged in the counterclockwise direction about the rotary shaft 72. Under the state shown in FIG. 3, the planetary arm engaging portion 70a is engaged with a rotary edge 38a of the planetary arm 38. As a result, the meshed state between the planetary gear 44 and the transmission gear 46 is maintained regardless of the rotating direction of the sun gear 36.

The second engaging lever 78 whose main body is shaped like a boomerang comprises a projecting portion 78a, a planetary arm engaging portion 78b, a hole 78c and an engaging portion 78d. Also, the joining lever 74 comprises an engaging portion 74a engaged with the engaging portion 78d of the second engaging lever 78 and a hole 74b. A shaft 80 is engaged with the hole 78c such that the second engaging lever 78 is rotatable about the shaft 80. Also, a shaft 76 is engaged with the hole 74b such that the joining lever 74 is rotatable about the shaft 76.

A spring 86 is attached to the joining lever 74 under the state that the engaging portion 78d of the second engaging lever 78 is engaged with the engaging portion 74a of the joining lever 74 such that the joining lever 74 is kept urged in the clockwise direction about the shaft 76. On the other hand, the second engaging lever 78 engaged with the joining lever 74 is kept urged in the counterclockwise direction about the shaft 80.

A cam 12g is formed in a lower portion of the cam plate 12 on the back side of the paper sheet in FIG. 3. If the cam plate 12 is rotated in the clockwise direction, the cam 12g abuts against a tip portion 74c of the joining lever 74. If the cam plate 12 is further rotated in the clockwise direction, the tip portion 74c is pushed so as to rotate the joining lever 74 in the counterclockwise direction. As a result, the second engaging lever 78 is rotated in the clockwise direction.

Figure 4:
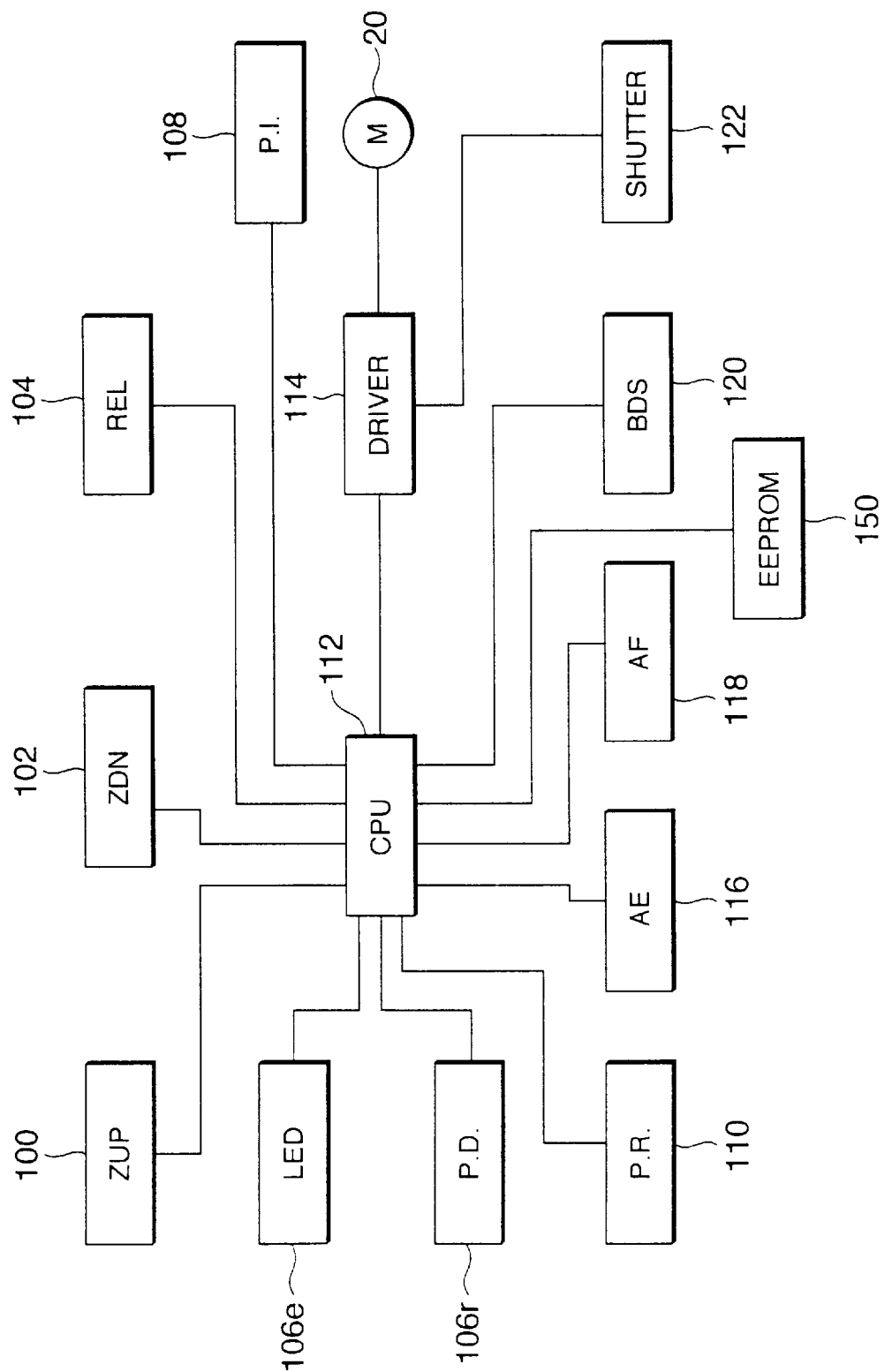
FIG. 4 is a block diagram schematically showing the control circuit of a camera in which a mechanical power switching apparatus according to one embodiment of the present invention is incorporated.

FIG. 4 is a block diagram schematically showing the electronic circuit within the camera in which is incorporated the mechanical power switching apparatus according to one embodiment of the present invention. A CPU 112 included in the electronic circuit serves to control the operation sequence of the camera. Connected to the CPU 112 are switches such as a zoom up switch 100, a zoom down switch 102, a release switch 104, and a rear lid switch 120. The zoom up switch 100 is operated by a photographer when the focal length of the photographing optical system is changed toward the longer focal length position. The zoom down switch 102 is operated by the photographer when the focal length of the photographing optical system is changed to the wide side. The release switch 104 is operated by the photographer when the photographing operation is started. Further, the rear lid switch 120 is a switch for allowing the CPU 112 to detect the open/close state of a rear lid (not shown) of the camera.

Connected to the CPU 112 are circuit elements such as the light emitting element 106e, the light receiving element 106r, a photo-reflector 110, and the photo-interrupter 108. As already described, the light emitting element 106e and the light receiving element 106r serve to detect the angular position of the cam plate 12, i.e., the zoom position of the photographing optical system. On the other hand, the photo-interrupter 108 serves to detect the rotating speed of the motor 20, as already described. Further, the photo-reflector 110 serves to detect the perforation of the photographic film loaded in the camera.

Further connected to the CPU 112 are a light metering circuit 116, a distance measuring circuit 118 and an EEPROM 150. In addition, the motor 20 and a shutter 122 are connected to the CPU 112. The motor 20 and the shutter 122 are connected to the CPU 112 via a driver circuit 114. The light metering circuit 116 outputs the result of measurement of the brightness of the object to the CPU 112. Also, the distance measuring circuit 118 outputs the result of measurement of the distance between the camera and the object, i.e., the photographing distance, to the CPU 112. Recorded in the EEPROM 150 are an adjustment constant for allowing the difference among the individual cameras in, for example, the precision of the camera derived from the electrical and mechanical nonuniformity among the individual cameras to fall within a predetermined range and data that should be retained even if the battery is withdrawn such as the presence or absence of the photographic film and the number of remaining frames.

The CPU 112 controls the motor 20 and the shutter 122 on the basis of the signals supplied from the switches, the circuit element or the circuits described above.

The following description covers the case where the mechanical power generated from the motor 20 is switched from the use for driving the lens barrel to the use for feeding the photographic film. The camera described in this embodiment of the present invention is a camera of a so-called "pre-wind system". The pre-wind system implies the system that all the photographic film is wound up about the spool at the time when the film (cartridge) is loaded in the camera and the rear lid is closed, and that one frame of the film is wound up in the cartridge every time a single photographing operation is performed. In the following description, the operation of winding up one frame of the film in the cartridge is called a one-frame wind up operation.

(1) One-frame Wind up Operation

The one-frame wind up operation is started every time a single photographing operation, i.e., the operations of the light measurement, the distance measurement, the focus adjustment, and the exposure, is carried out. FIGS. 5 to 9, each showing the portion equal to that shown in FIG. 3, collectively show sequentially how the mechanical power generated from the motor 20 is switched from the use for driving the lens barrel to the use for feeding the photographic film and, then, back to the use for driving the lens barrel after completion of the photographing sequence. To be more specific, FIGS. 5 to 9 collectively show how the engaging levers 70 and 78 are switched so as to be engaged with and not to be engaged with the rotary edge 38a of the planetary arm 38 in accordance with rotation of the cam plate 12. Incidentally, arrows W and T are shown near the sun gear 36 in each of FIGS. 3 and 5 to 9. If the sun gear 36 is rotated in the direction denoted by the arrow T under the state that the planetary gear 44 is meshed with the transmission gear 46, the movable barrel 4 shown in FIG. 1 is moved forward (toward the longer focal length position). On the other hand, if the sun gear 36 is rotated in the direction denoted by the arrow W, the movable barrel 4 is moved rearward (toward the wide side).

Figure 5:
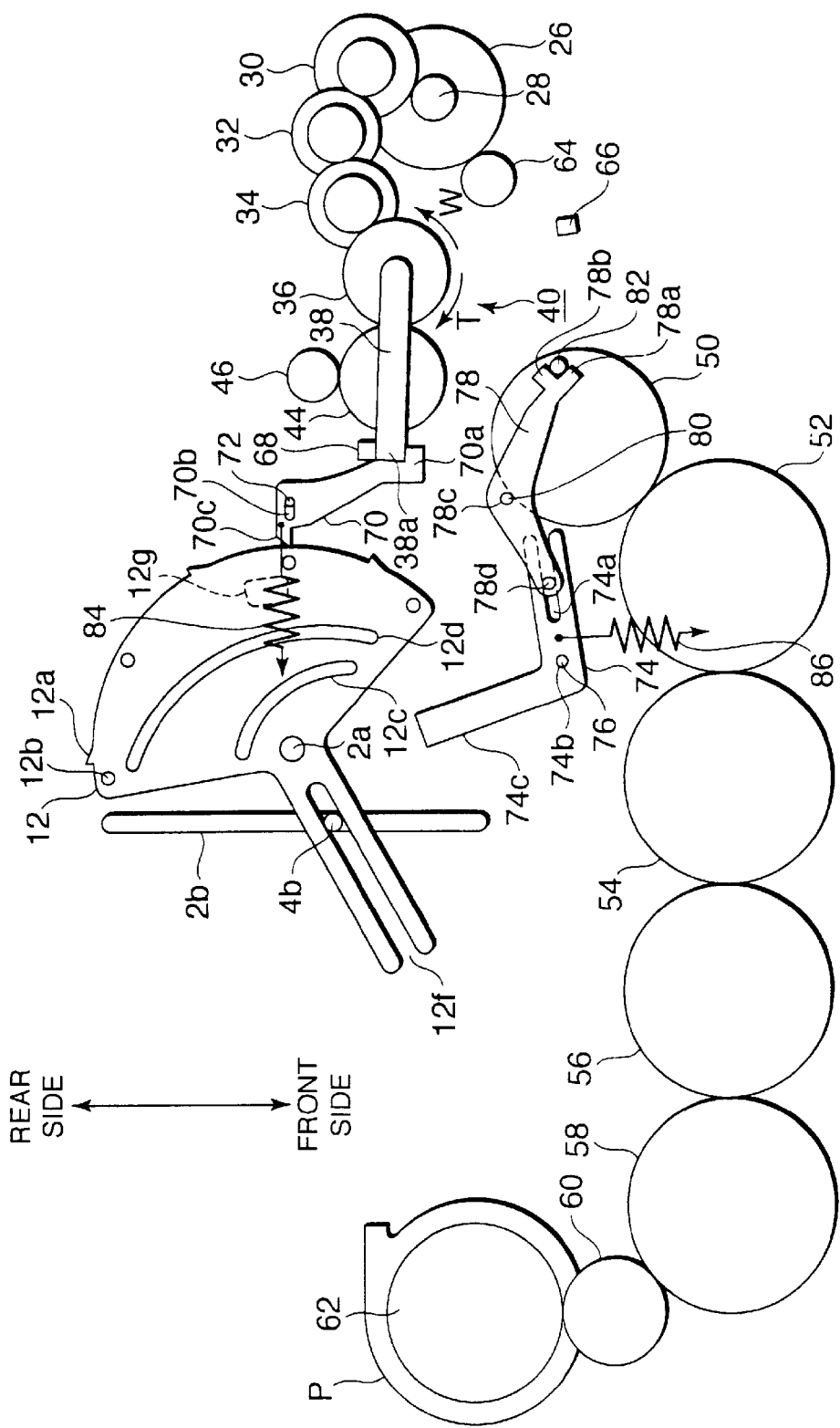
FIG. 5 is a drawing for explaining the operation of a mechanical power switching apparatus according to one embodiment of the present invention, and shows how the mechanical power is switched to use for driving a zoom optical system.

FIG. 5 shows the state immediately after completion of the photographing operation in the middle position. If the gear 28 is rotated in the clockwise direction in accordance with rotation of the motor 20 shown in FIG. 1 in the clockwise direction as viewed from the front side of the paper sheet in each of FIGS. 3 and 5 to 9 under the state shown in FIG. 5, the sun gear 36 is rotated in the direction denoted by the arrow T. As a result, the movable barrel 4 is moved forward, and the pin 4b is also moved forward (downward in FIG. 5). In accordance with the downward movement of the pin 4b in FIG. 5, the cam plate 12 is rotated in the counterclockwise direction as viewed from the front side of the paper sheet in FIG. 5. In the following description, the rotation in, for example, the clockwise direction as viewed from the front side of the paper sheet in each of FIGS. 3 and 5 to 9 is simply represented by the rotation in the clockwise direction unless otherwise specified.

Figure 6:
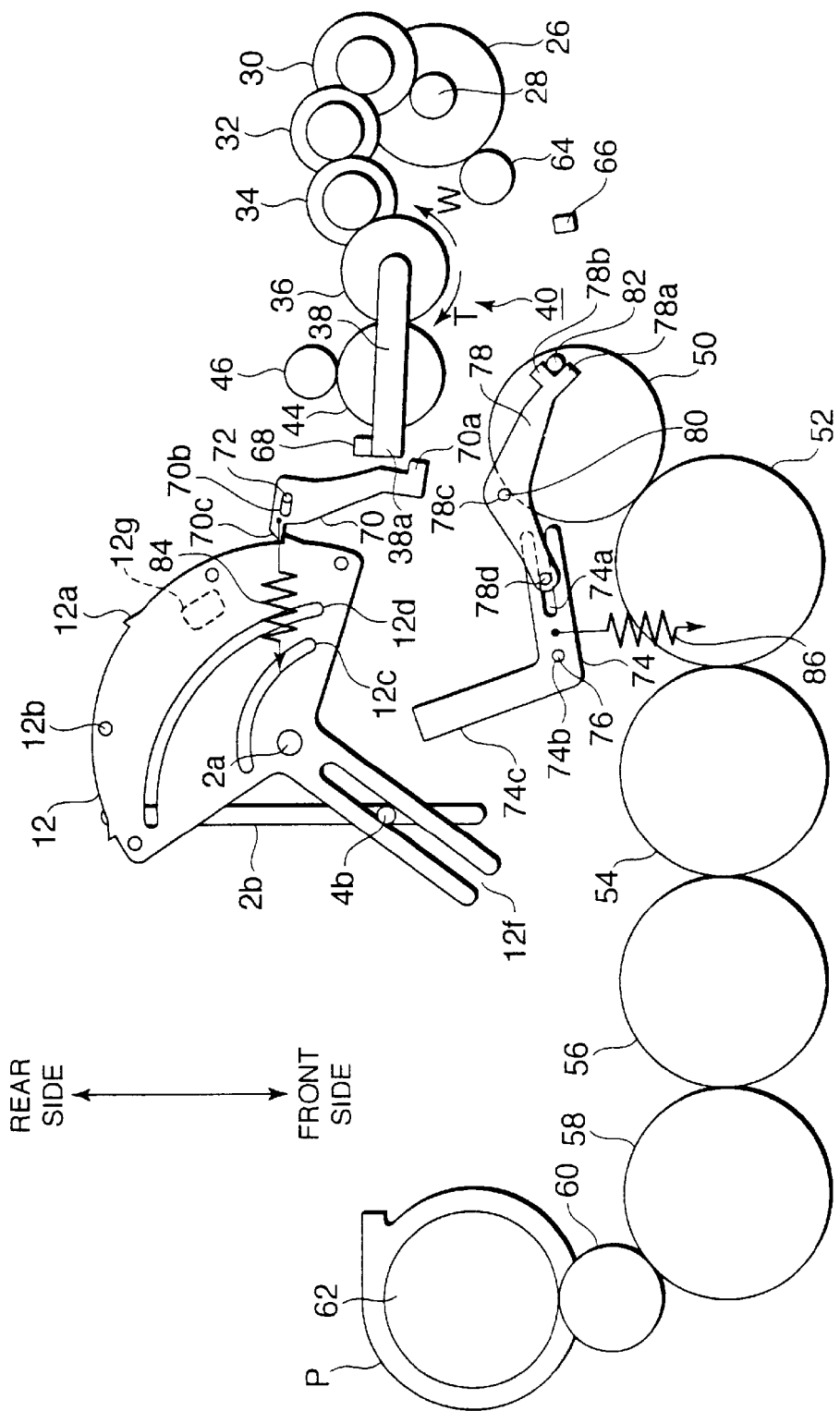
FIG. 6 is a drawing for explaining the operation of a mechanical power switching apparatus according to one embodiment of the present invention, and shows the state that the engagement of a planetary arm is released.

If the cam plate 12 is interlocked with the forward movement of the movable barrel 4 so as to be rotated in the counterclockwise direction, the cam 12a of the cam plate 12 is caused to abut against the hook portion 70c of the first engaging lever 70. If the cam plate 12 is further rotated in the counterclockwise direction, the cam 12a pushes the hook portion 70c, as shown in FIG. 6. As a result, the first engaging lever 70 is rotated in the clockwise direction about the rotary shaft 72 so as to cause the planetary engaging section 70a to be disengaged from the rotary edge 38a of the planetary arm 38. However, since the sun gear 36 is rotated in the clockwise direction denoted by the arrow T in this stage, the meshed state between the planetary gear 44 and the transmission gear 46 is maintained.

After the engagement between the first engaging lever 70 and the planetary arm 38 is released as shown in FIG. 6, the motor 20 is rotated in the counterclockwise direction. As a result, the sun gear 36 is rotated in the counterclockwise direction, and the planetary arm 38 is rotated in the counterclockwise direction because the engagement between the planetary arm 38 and the first engaging lever 70 is released.

Figure 7:
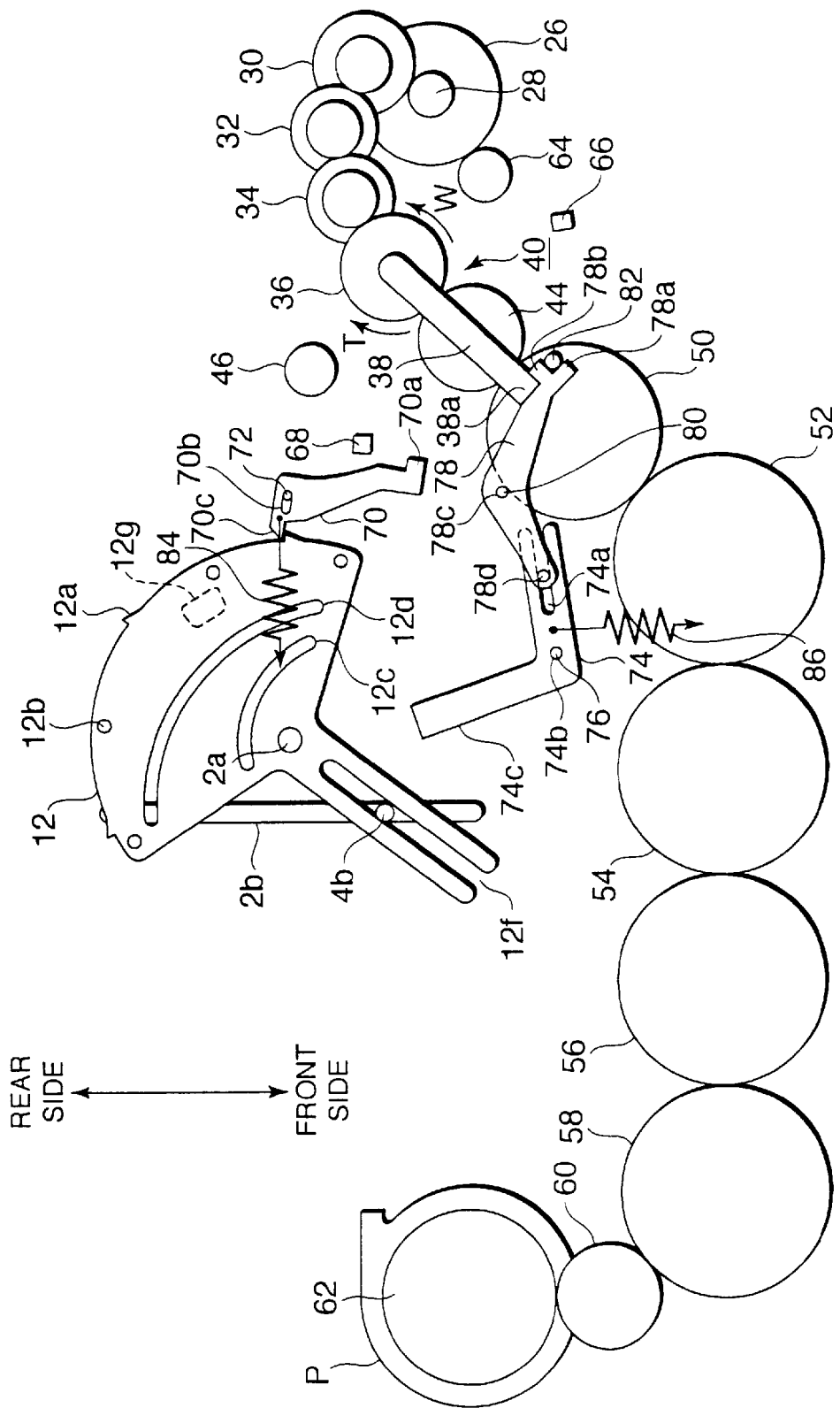
FIG. 7 is a drawing for explaining the operation of a mechanical power switching apparatus according to one embodiment of the present invention, and shows the state that the mechanical power is switched to use for winding a photographic film within a cartridge.
Figure 8:
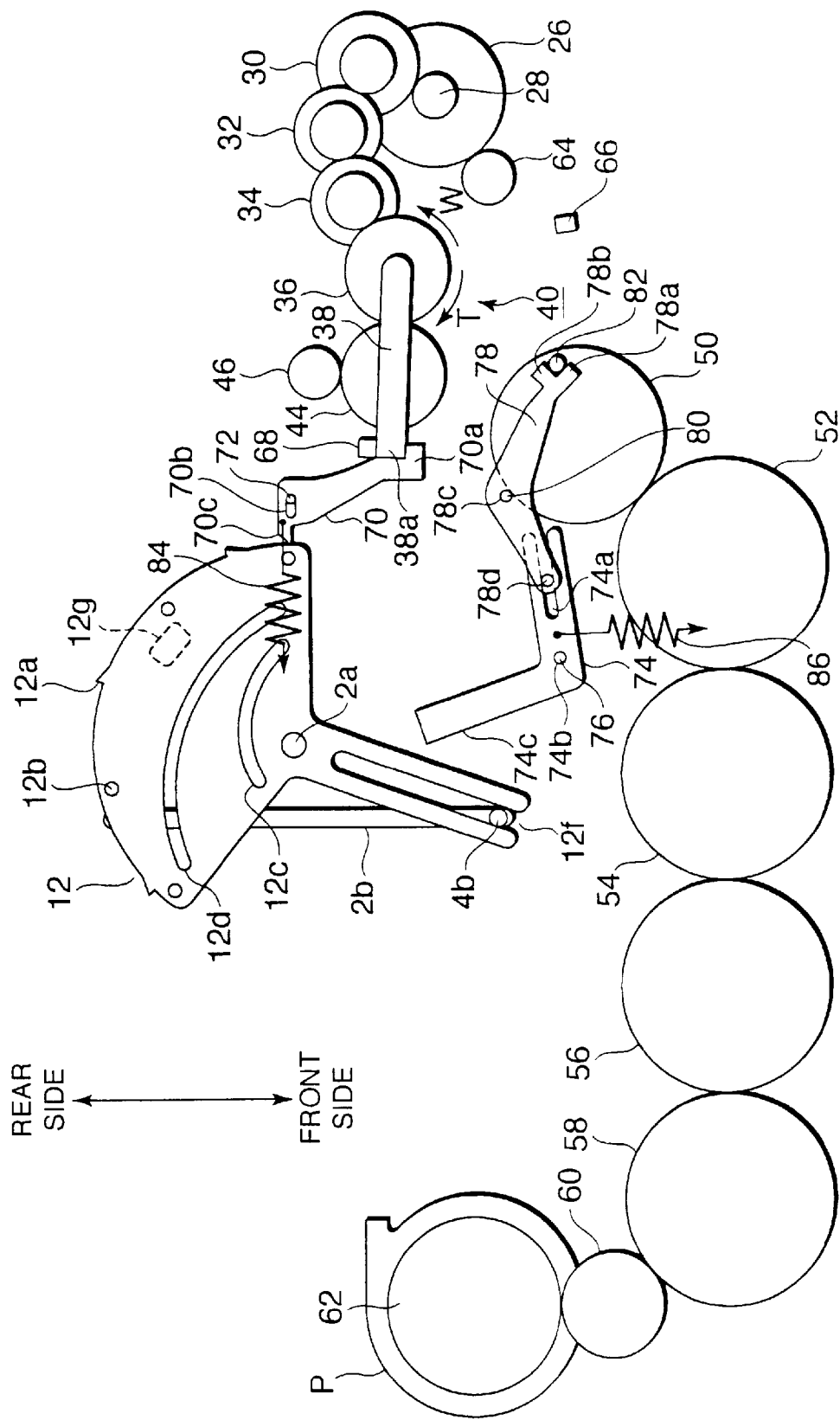
FIG. 8 is a drawing for explaining the operation of a mechanical power switching apparatus according to one embodiment of the present invention, and shows that the mechanical power is switched to use for driving a zoom optical system.

Then, the rotary edge 38a of the planetary arm 38 is engaged with the planetary arm engaging portion 78b of the second engaging lever 78 as shown in FIG. 7. If the sun gear 36 continues to be rotated in the counterclockwise direction under the state shown in FIG. 7, the idle gear 50 meshed with the planetary gear 44 begins to be rotated in the counterclockwise direction. As a result, the torque is transmitted to the fork gear 62 via the idle gears 52, 54, 56, 58 and 60 so as to cause the fork gear 62 to start rotation in the counterclockwise direction.

By the rotation of the fork gear 62 in the counterclockwise direction, that portion of the photographic film which was exposed to light is wound up within the cartridge. In this step, the CPU 112 detects the signal generated from the photo-reflector 110 shown in FIG. 4, and it is judged that the photographic film for 8 perforations has been fed so as to once stop the motor 20.

The motor 20 begins to be rotated again in the clockwise direction under the control of the CPU 112, and in accordance with rotation of the motor 20, the sun gear 36 also begins to be rotated in the clockwise direction. As a result, the planetary arm 38 is rotated in the clockwise direction so as to permit the transmission gear 46 and the planetary gear 44 to be meshed again, thereby moving forward the movable barrel 4. In accordance with the movement of the movable barrel 4 in the forward direction, the cam plate 12 is rotated in the counterclockwise direction. As a result, the engagement between the cam 12a and the hook 70c is released so as to permit the first engaging lever 70 to be rotated in the counterclockwise direction about the rotary shaft 72. Also, the planetary arm engaging portion 70a is engaged again with the rotary edge 38c of the planetary arm 38. The CPU 112 judges that the planetary arm engaging portion 70a is engaged again with the rotary edge 38a of the planetary arm 38 on the basis of the signals generated from the photo-interrupter 108 and the light receiving element 106r so as to once stop the motor 20.

In the next step, the CPU 112 permits the motor 20 to be rotated in the counterclockwise direction. As a result, the sun gear 36 is also rotated in the counterclockwise direction. In this step, the rotary edge 38a of the planetary arm 38 is engaged with the planetary arm engaging portion 70a of the first engaging lever 70 so as to maintain the meshed state between the planetary gear 44 and the transmission gear 46 regardless of the rotating direction of the sun gear 36. Also, the movable barrel 4 is moved backward so as to permit the cam plate 12 to be rotated in the clockwise direction.

Figure 9:
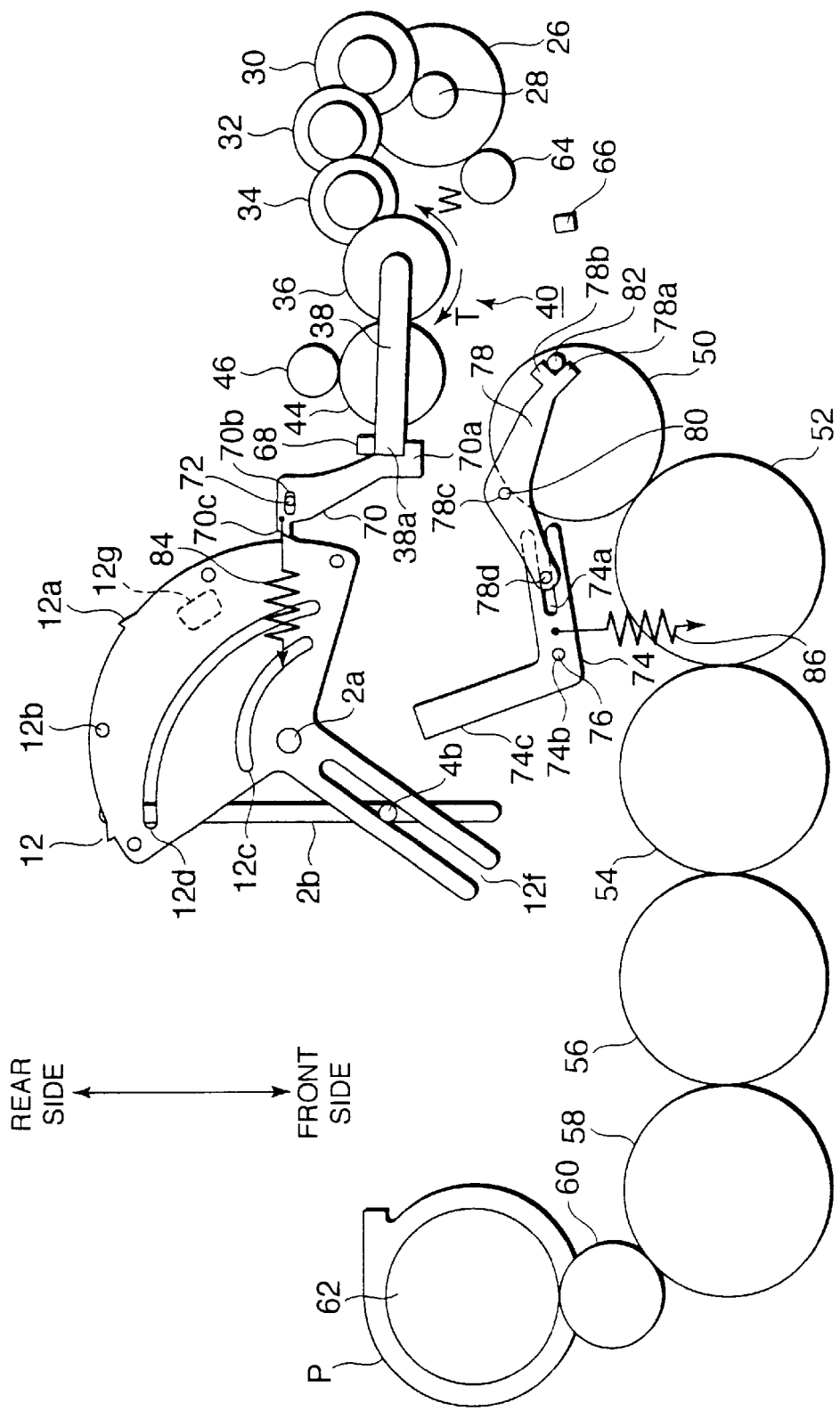
FIG. 9 is a drawing for explaining the operation of a mechanical power switching apparatus according to one embodiment of the present invention, and shows how the hook portion of an engaging lever jumps over the cam portion of a cam plate when the zoom optical system is moved toward a longer focal length position.

By the rotation of the cam plate 12 in the clockwise direction, the cam 12a is allowed to abut against the hook portion 70c of the first engaging lever 70 as shown in FIG. 9. In this step, the inclined surfaces of the cam 12a and the hook portion 70c are allowed to abut against each other. In addition, since the planetary arm engaging portion 70a abuts against the rotary edge of the planetary arm 38, the first engaging lever 70 is incapable of rotation in the counterclockwise direction. As a result, the hook portion 70c is moved to the right in FIG. 9 in a manner to climb the inclined surface of the cam 12a. The CPU 112 judges that the movable barrel 4 and the cam plate 12 have been brought back to the original positions on the basis of the signals generated from the photo-interrupter 108 and the light receiving element 106r so as to stop the motor 20.

Figure 10:
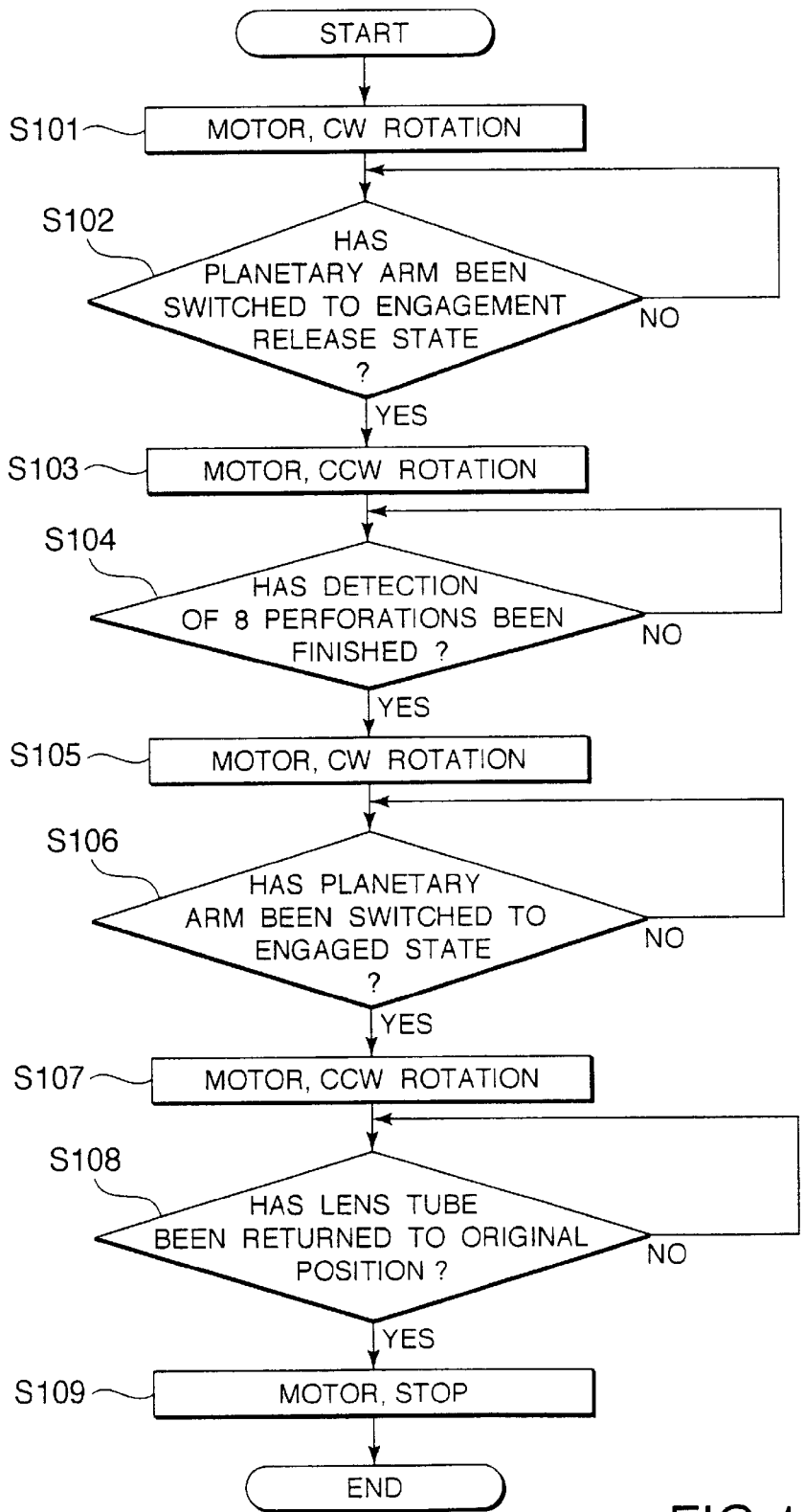
FIG. 10 is a flow chart showing the procedures of control performed by a CPU within a camera into which a mechanical power switching apparatus according to one embodiment of the present invention is incorporated, said flow chart being used for explaining how the wind-up operation of one frame of a photographic film is controlled.

The control procedure performed by the CPU 112 in carrying out the one-frame wind up operation described above will now be described with reference to the flow chart shown in FIG. 10. The flow chart shown in FIG. 10 schematically shows the one-frame wind up control program of the photographic film, which is executed by the CPU 112 after completion of a series of photographing operations.

In step S101, the CPU 112 permits the motor 20 to be rotated in the clockwise direction. In step S102, the CPU 112 judges whether or not the engagement between the planetary arm engaging portion 70a and the rotary edge 38a of the planetary arm 38 has been released on the basis of the signals generated from the photo-interrupter 108 and the light receiving element 106r. If it has been judged in step S102 that the engagement has not been released, the CPU 112 repeatedly performs the judgment in step S102. If it has been judged that the engagement has been released, the operation proceeds to step S103.

In step S103, the CPU 112 once stops the motor 20 and, then, permits the motor 20 to be rotated in the counterclockwise direction. In this step, the planetary arm 38 is rotated in the counterclockwise direction, and the planetary gear 44 is meshed with the idle gear 50, as shown in FIG. 7. In step S104, the CPU 112 detects the signal generated from the photo-reflector 110, and counts the number of perforations of the photographic film so as to judge whether or not the number of perforations has reached 8. If it has been judged in step S104 that the number of perforations has not yet reached 8, the CPU 112 repeats the judging operations in step S104. On the other hand, if it has been judged that the number of perforations has reached 8, the operation proceeds to step S105 so as to once stop the motor 20 and, then, rotates the motor 20 in the clockwise direction.

In step S106, the CPU 112 judges again whether or not the planetary arm engaging portion 70a is engaged again with the planetary arm 38 on the basis of the signals generated from the photo-interrupter 108 and the light receiving element 106r. If it has been judged in step S106 that the planetary arm engaging portion 70a is not engaged with the planetary arm 38, the CPU 112 repeats the operation of step S106.

If it has been judged that the planetary arm engaging portion 70a is engaged with the planetary arm 38, the CPU 112 proceeds to step S107 so as to one stop the motor 20 and, then, rotates the motor 20 in the counterclockwise direction. In step S108, the CPU 112 judges whether or not the movable barrel 4 and the cam plate 12 have been brought back to the original positions before execution of step S101 on the basis of the signals generated from the photo-interrupter 108 and the light receiving element 106r. If it has been judged that the movable barrel 4 and the cam plate 12 have not yet been brought back to the original positions, the CPU 112 continues to carry out the operation in step S108. On the other hand, if it has been judged that the movable barrel 4 and the cam plate 12 have been brought back to the original positions, the CPU 112 proceeds to step S109 so as to stop the motor 20, thereby finishing the one-frame wind up processing.

(2) Zoom Up/Zoom Down Operation

If the photographer operates the zoom up switch 100 or the zoom down switch 102 shown in FIG. 4, the CPU 112 rotates the motor 20 in the clockwise direction or in the counterclockwise direction so as to move the movable barrel 4 forward or rearward.

If the cam plate 12 in the angular position shown in FIG. 6 switches the rotating direction of the motor 20 from the clockwise direction to the counterclockwise direction in performing the zoom up/zoom down operation noted above, it is impossible to perform the zoom down operation. In addition, the photographic film is wound up within the cartridge. In order to prevent such an undesired operation during the zoom up/zoom down operation, the CPU 112 controls the motor 20 as described below.

Specifically, even if the CPU 112 detects that the zoom up switch 100 or the zoom down switch 102 is turned off, i.e., even if it is detected that the photographer stopped the operation of these switches, the rotation of the motor 20 is maintained. The motor 20 is stopped after the signals generated from the photo-interrupter 108 and the light receiving element 106r are monitored and it is judged that the planetary arm engaging portion 70a of the first engaging lever 70 is engaged with the rotary edge 38a of the planetary arm 38. By controlling the motor 20 in this fashion, the undesired operation, i.e., the wind up operation of the photographic film, ceases to be performed when the photographer performs the zoom operation.

Figure 11:
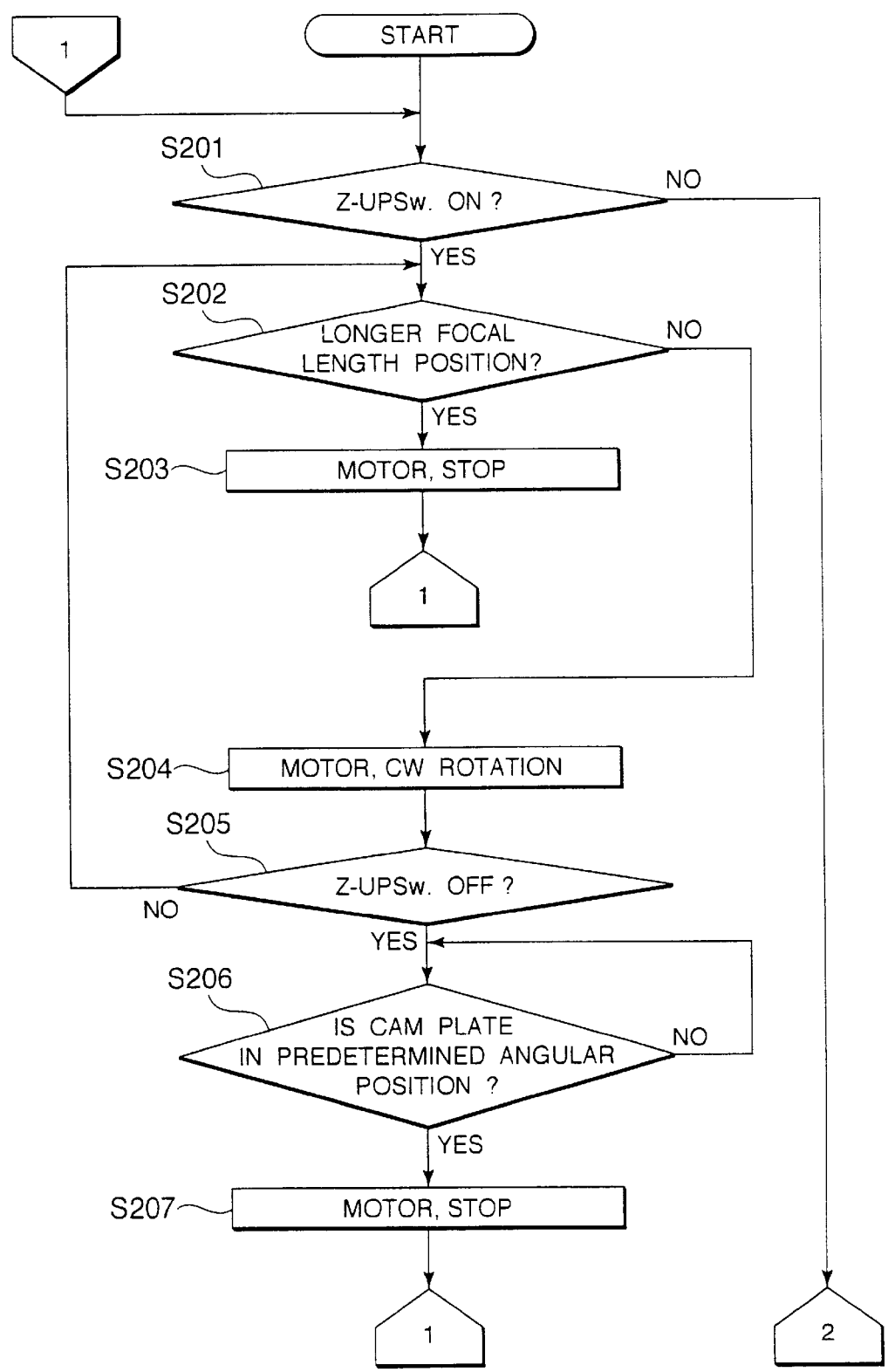
FIG. 11 is a flow chart showing the procedures of control performed by a CPU within a camera into which a mechanical power switching apparatus according to one embodiment of the present invention is incorporated, said flow chart being used for explaining how the zoom operation of the photographing system is controlled.
Figure 12:
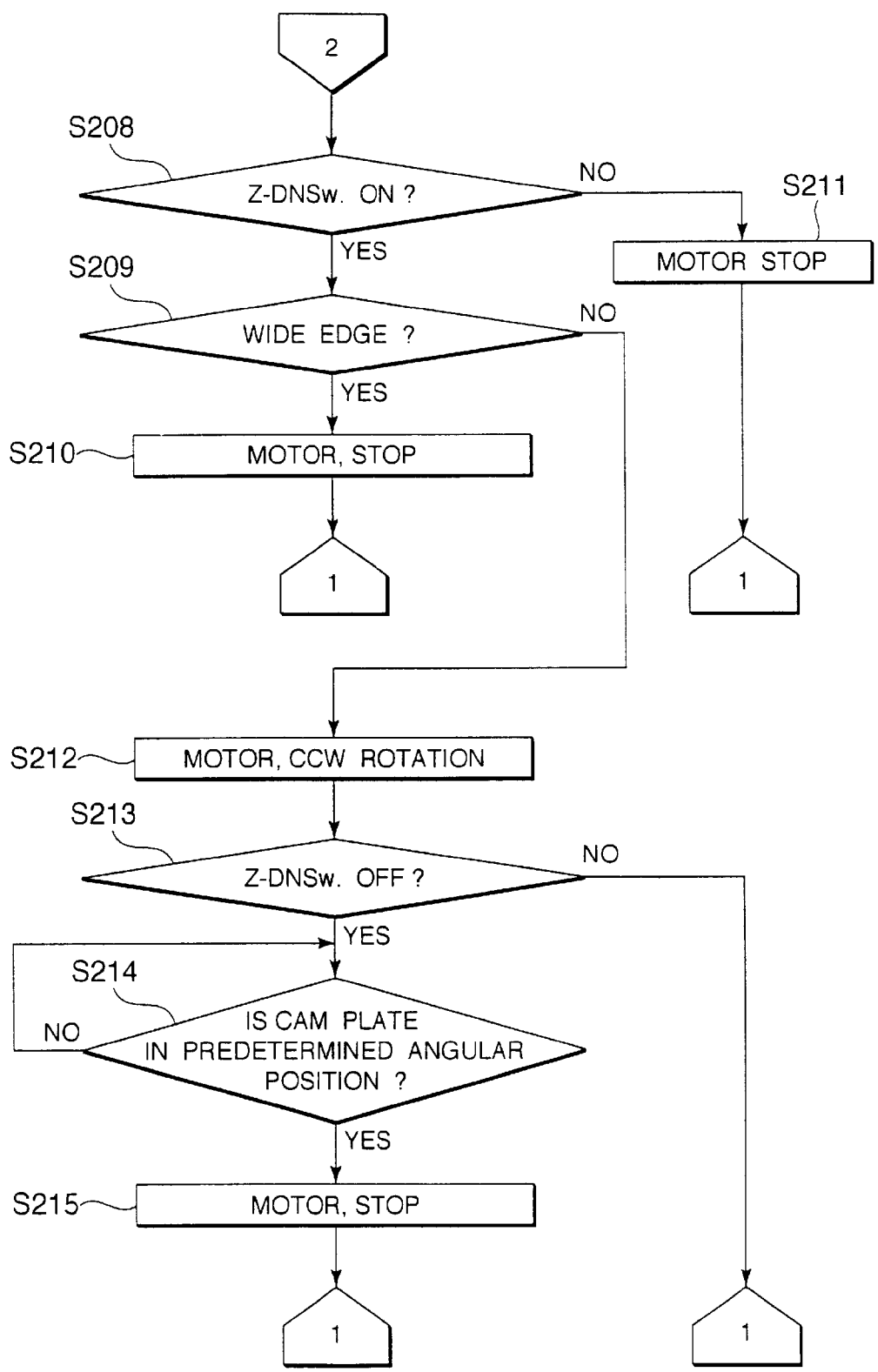
FIG. 12 is a flow chart showing the operation after the operation shown in the flow chart of FIG. 11.

The control procedure performed by the CPU 112 when the zoom up/zoom down operation described above is performed will now be described with reference to the flow charts shown in FIGS. 11 and 12. The flow charts shown in FIGS. 11 and 12 schematically show the program executed by the CPU 112 in order to detect the states of the zoom up switch 100 and the zoom down switch 102.

In step S201, the CPU 112 judges whether or not the zoom switch 100 is depressed (or turned on). If it is judged in step S20a that the zoom up switch 100 is not depressed, the CPU 112 proceeds to step S208, and if it is judged that the zoom up switch 100 is depressed, the CPU 112 proceeds to step S202. In step S202, the CPU 112 judges whether or not the lens barrel is positioned on the longer focal length position, i.e., the position at which the zoom up can no more be performed, on the basis of the signals generated from the photo-interrupter 108 and the light receiving element 106r. If it is judged in step S202 that the lens barrel is not positioned on the longer focal length position, the operation is branched to step S204. If it is judged, however, that the lens barrel is positioned on the longer focal length position, the CPU 112 proceeds to step S203.

In step S203, the CPU 112 generates a signal for stopping the motor 20 to the driver 114 shown in FIG. 4 and is returned back to step S201.

In step S204 to which the operation is branched in the case where the judgment in step S202 is negative, i.e., where it is judged that the lens barrel is not positioned on the tele-side, the CPU 112 generates a signal to rotate the motor 20 in the clockwise direction to the driver 114. In the subsequent step S205, the CPU 112 judges whether or not the zoom up switch 100 is turned off. If the judgment is negative, i.e., where it is judged that the zoom up switch 100 is not turned off, the operation is returned to step S202. On the other hand, if the judgment is positive, the operation proceeds to step S206.

In step S206, the CPU 112 judges whether or not the lens barrel is positioned in the middle position or in the focusing reset position in the position of the tele position on the basis of the signals generated from the light receiving element 106r. If the judgment in step S206 is negative, the judgment in step S206 is continued. If the judgment is positive, however, the operation proceeds to step S207 so as to output a signal for stopping the motor 20 to the driver 114. The CPU 112 finishes the processing in step S207, and the operation is returned back to step S201.

The focusing reset position noted above implies the position to which the lens barrel is brought back before the start up of the focusing operation or in preparation for the next photographing operation after completion of the one-frame photographing operation. Under the state that the lens barrel is positioned in the focusing reset position, the first engaging lever 70 is engaged with the rotary edge 38a of the planetary arm 38. It follows that the positive judgment in step S206 implies that the meshed state between the planetary gear 36 and the transmission gear 46 is maintained when the motor 20 is rotated in any of the clockwise direction and the counterclockwise direction.

In step S208 to which the operation is branched when the judgment in step S201 is negative, the CPU 112 judges whether or not the zoom down switch 102 is depressed. If the judgment in step S208 is negative, the operation of the CPU 112 is branched to step S211 so as to output a signal for stopping the motor 20 to the driver 114, and the operation is brought back to step S201. If the judgment in step S208 is positive, the operation proceeds to step S209.

In step S209, the CPU 112 judges whether or not the lens barrel is in the wide edge, i.e., the position where no more zoom down cannot be performed, on the basis of the signals generated from the photo-interrupter 108 and the light receiving element 106r. If the judgment in step S209 is negative, the operation of the CPU 112 is branched into step S212. If the judgment is positive, however, the operation proceeds to step S210. In step S210, the CPU 112 outputs a signal for stopping the motor 20 to the driver 114, and the operation is brought back to step S201.

In step S212 to which the operation is branched in the case where the judgment in step S209 is negative, the CPU 112 outputs a signal for rotating the motor 20 in the counter-clockwise direction to the driver 114. In the subsequent step S213, the CPU 112 judges whether or not the zoom down switch 102 is turned off. If the judgment in step S213 is negative, the operation is brought back to step S201 and, if the judgment is positive, the operation proceeds to step S214.

In step S214, the CPU 112 judges whether the lens barrel is in the wide position or in the focusing reset position in the position of the middle position. If the judgment in step S214 is negative, the judgment in step S214 is continued. If the judgment is positive, however, the operation proceeds to step S215, and the CPU 112 generates a signal for stopping the rotation of the motor 20 to the driver 114. The CPU 112 finishes the processing in step S215 and the operation is brought back to step S210.

As described above, the CPU 112 rotates the motor 20 in accordance with the states of the zoom up switch 100 and the zoom down switch 102 so as to control the zoom up/zoom down operation. Incidentally, the flow chart shown in FIGS. 11 and 12 is constructed not to permit withdrawal once the flow is executed in order to avoid the complexity of description. In order to avoid the difficulty, it is possible to insert before, for example, step S201 the process step of detecting the states of the switches other than the zoom up switch 100 and the zoom down switch 102 and withdrawing from the loop of steps S201 to S215 depending on the detected state.

(3) Pre-wind Operation

In performing the pre-wind operation, a rear lid (not shown) is opened and a cartridge P is loaded. If the rear lid is closed, the pre-wind operation is executed. FIGS. 13 to 16, each showing the portion equal to that shown in FIG. 3 like FIGS. 5 to 9 used for describing the one-frame wind up operation, collectively show sequentially how each of the engaging levers 70 and 78 is switched from the engaged state with to the disengaged state with the rotary edge 38a of the planetary arm 38 for performing the pre-wind operation after the CPU 112 has detected that the rear lid is closed. Arrows T and W are also shown near the sun gear 36 in FIGS. 13 to 16. If the sun gear 36 is rotated in the direction denoted by the arrow T under the state that the planetary gear 44 is in mesh with the transmission gear 46, the movable barrel 4 shown in FIG. 1 is moved forward (toward the longer focal length position). If the sun gear 36 is rotated in the direction denoted by the arrow W, however, the movable barrel 4 is moved rearward (toward the wide side). In the following description, it is assumed that the lens barrel (movable barrel 4) immediately before the rear lid is closed is in the lens stowed position.

Figure 13:
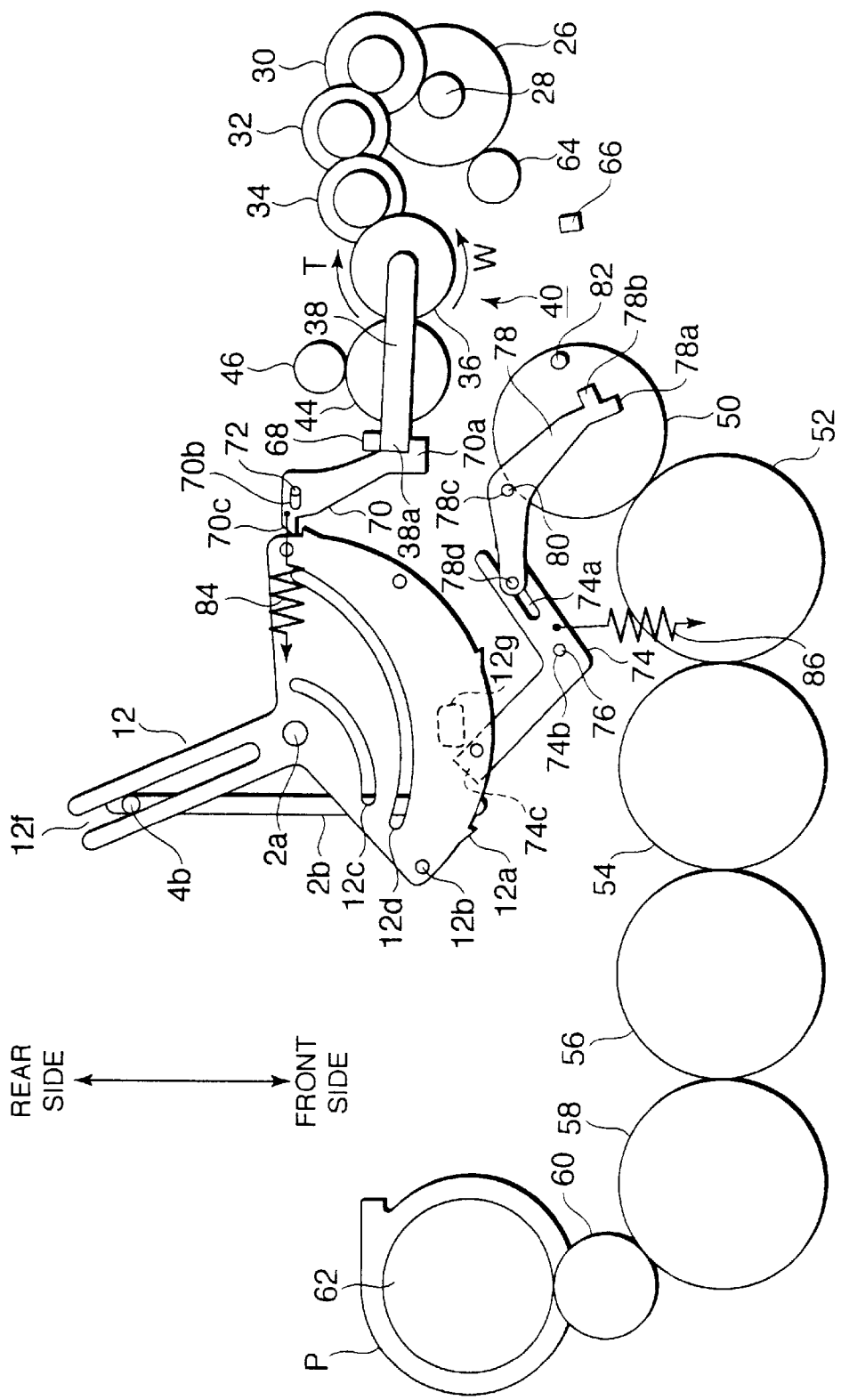
FIG. 13 is a drawing for explaining the operation of the mechanical power switching apparatus according to one embodiment of the present invention, and shows the initial state of the pre-wind operation.

FIG. 13 shows the state immediately after the CPU 112 has detected that the rear lid switch 120 is turned off, which corresponds to the state that the rear lid is closed. In FIG. 13, the first engaging lever 70 is in a position of engagement with the rotary edge 38a of the planetary arm 38, and the second engaging lever 78 is in a position of not being engaged with the rotary edge 38a of the planetary arm 38. In other words, FIG. 13 shows the state that the tip portion 74c of the joining lever 74 is pushed by the cam 12g, which is formed on the back side of the paper sheet in FIG. 13, of the cam plate 12 so as to allow the joining lever 74 to be rotated in the counterclockwise direction, and the second engaging lever 78 is interlocked with the rotation of the joining lever 74 so as to be rotated in the clockwise direction.

If the motor 20 is rotated in the clockwise direction under the state shown in FIG. 13, the sun gear 36 is rotated in the direction denoted by the arrow T. In this step, the movable barrel 4 is moved forward because the planetary gear 44 is in mesh with the transmission gear 46. Also, in accordance with the forward movement of the pin 4b, the cam plate 12 is rotated in the counterclockwise direction, and the lever position is as shown in FIG. 14.

Figure 14:
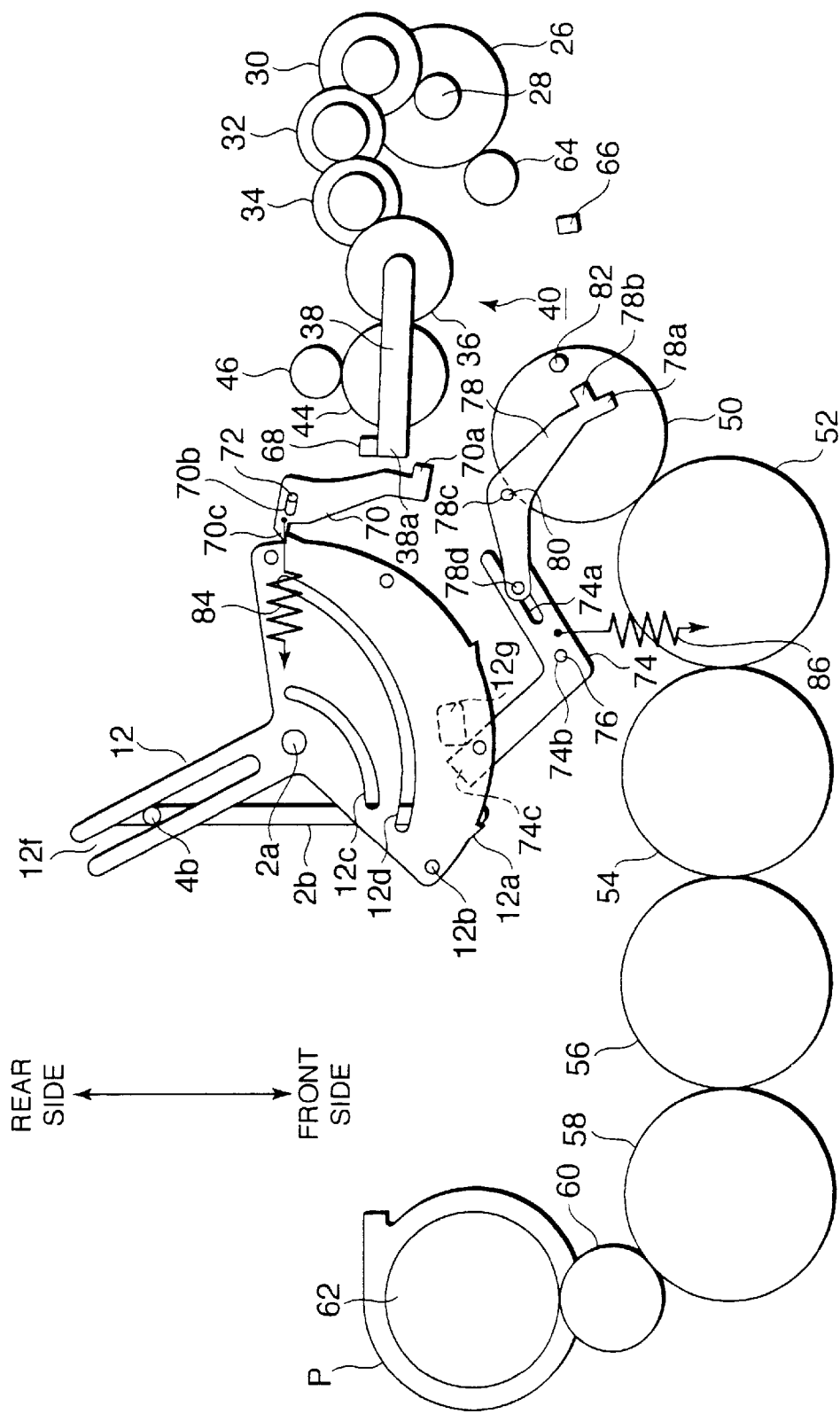
FIG. 14 is a drawing for explaining the operation of the mechanical power switching apparatus according to one embodiment of the present invention, and shows the state that the engagement of a rotary edge of a planetary arm is released.
Figure 15:
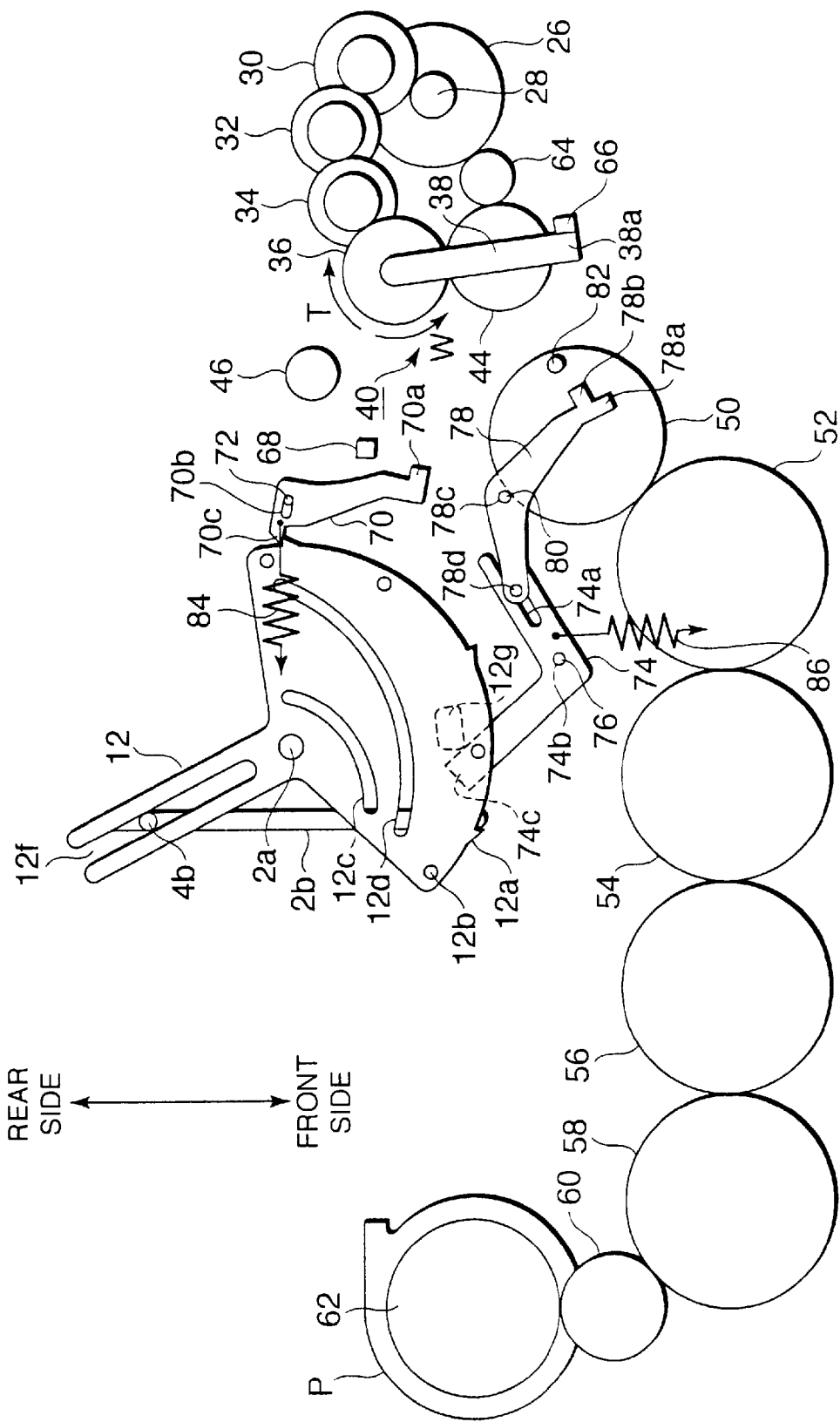
FIG. 15 is a drawing for explaining the operation of the mechanical power switching apparatus according to one embodiment of the present invention, and shows the state that the planetary gear is meshed with a spool for the pre-winding operation.

Under the state shown in FIG. 14, the hook portion 70c of the first engaging lever 70 is pushed by the cam 12a of the cam plate 12 so as to permit the first engaging lever 70 to be rotated in the clockwise direction. Also, the planetary arm engaging portion 70a of the first engaging lever 70 is in a position to release the engagement with the rotary edge 38a of the planetary arm 38. Under the state shown in FIG. 14, the rotating direction of the motor 20 is switched to the counterclockwise direction. As a result, the planetary arm 38 is rotated in the counterclockwise direction so as to be put in the state shown in FIG. 15. Then, the rotating force of the planetary gear 44 is transmitted to the spool 26 via the idle gear 64, with the result that the spool 26 begins to be rotated in the clockwise direction.

As described above, the spool 26 begins to be rotated in the direction of winding up the photographic film so as to start the pre-wind operation. Then, the CPU 112 monitors the signal generated from the photo-reflector 110 shown in FIG. 4 and judges whether or not the film is wound up smoothly on the basis of the length of the generating period of the pulse signals outputted from the photo-reflector 110. The CPU 112 is capable of detecting the end point of the film by judging whether or not the generating period of the pulse signals noted above is longer than a predetermined time out period. To be more specific, if pulse signals are outputted from the photo-reflector 110 within a certain time period, it is possible to judge that the film is forwarded. On the other hand, if the pulse signals are not outputted even a predetermined time later, it is judged that the motor 20 is stopped after wind up of the film to the end point of the film or the film loading resulted in failure.

Figure 16:
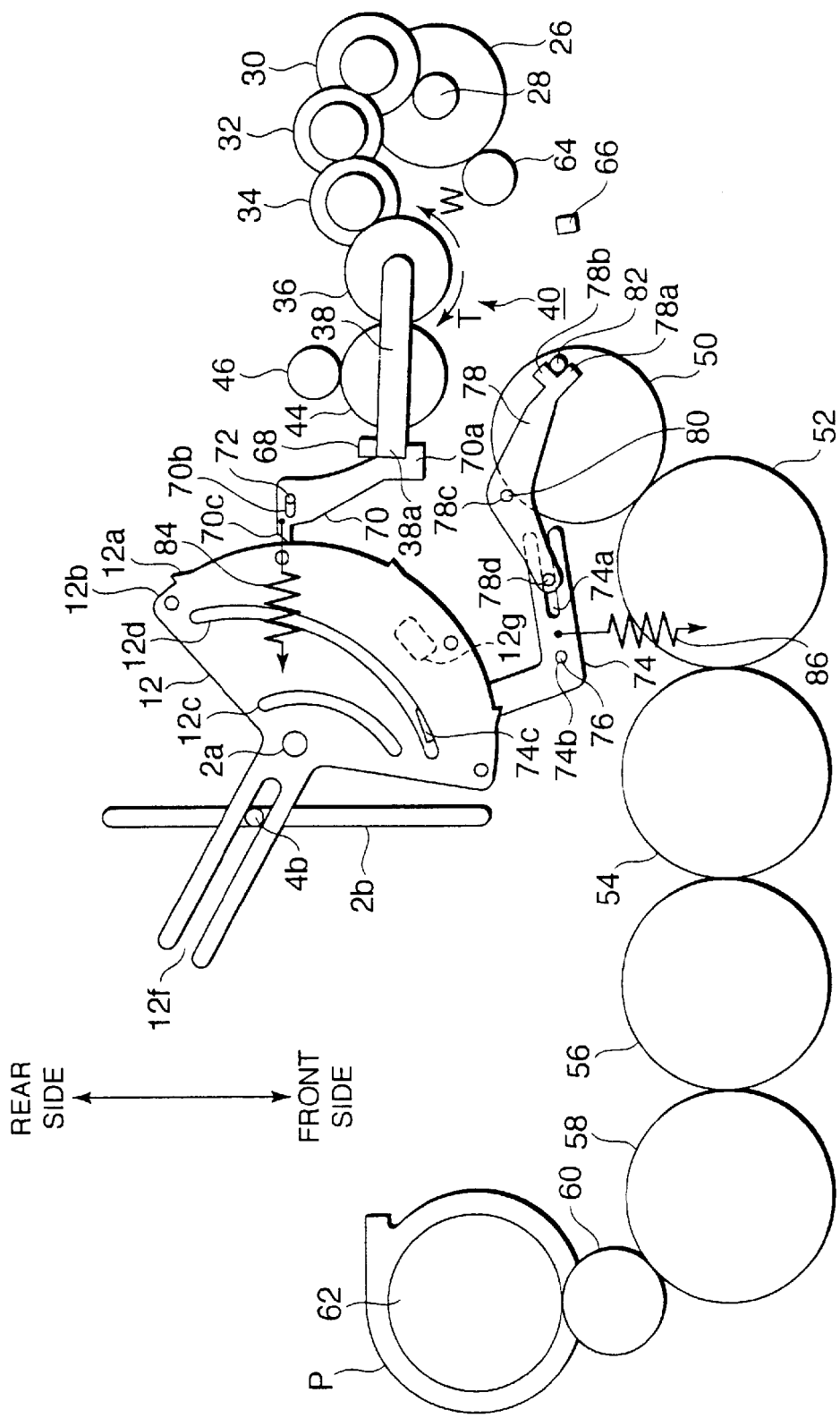
FIG. 16 is a drawing for explaining the operation of the mechanical power switching apparatus according to one embodiment of the present invention, and shows how the planetary gear is switched for the driving of a lens barrel.

Then, the CPU 112 once stops the motor 20 and, then, switches the driving direction of the motor 20 to the clockwise direction. As a result, the planetary arm 38 is rotated in the clockwise direction so as to allow the planetary gear 44 to be meshed with the transmission gear 46. Then, the movable barrel 4 is moved forward. The cam plate 12 is interlocked with the forward movement of the movable barrel 4 so as to be rotated in the counterclockwise direction. As a result, the engagement between the hook portion 70c of the first engaging lever 70 and the cam 12a is released so as to permit the first engaging lever 70 to be rotated in the counterclockwise direction about the shaft 72 by the function of the spring 84. Then, the rotary edge 38a of the planetary arm 38 is engaged again with the planetary arm engaging portion 78a, as shown in FIG. 16.

After the control operation described above, the CPU 112 permits the motor 20 to be rotated in the counterclockwise direction. As a result, the sun gear 36 is rotated in the counterclockwise direction, and the mechanical power of the sun gear 36 is transmitted to the transmission gear 46 so as to move the movable barrel 4 in the rearward direction. Then, the CPU 112 detects that the zoom lens barrel is returned back to the lens stowed position, i.e., the CPU 112 detects that the cam plate 12 is returned to the position shown in FIG. 13, on the basis of the signals generated from the photo-interrupter 108 and the light receiving element 106r, so as to stop the motor 20.

Figure 17:
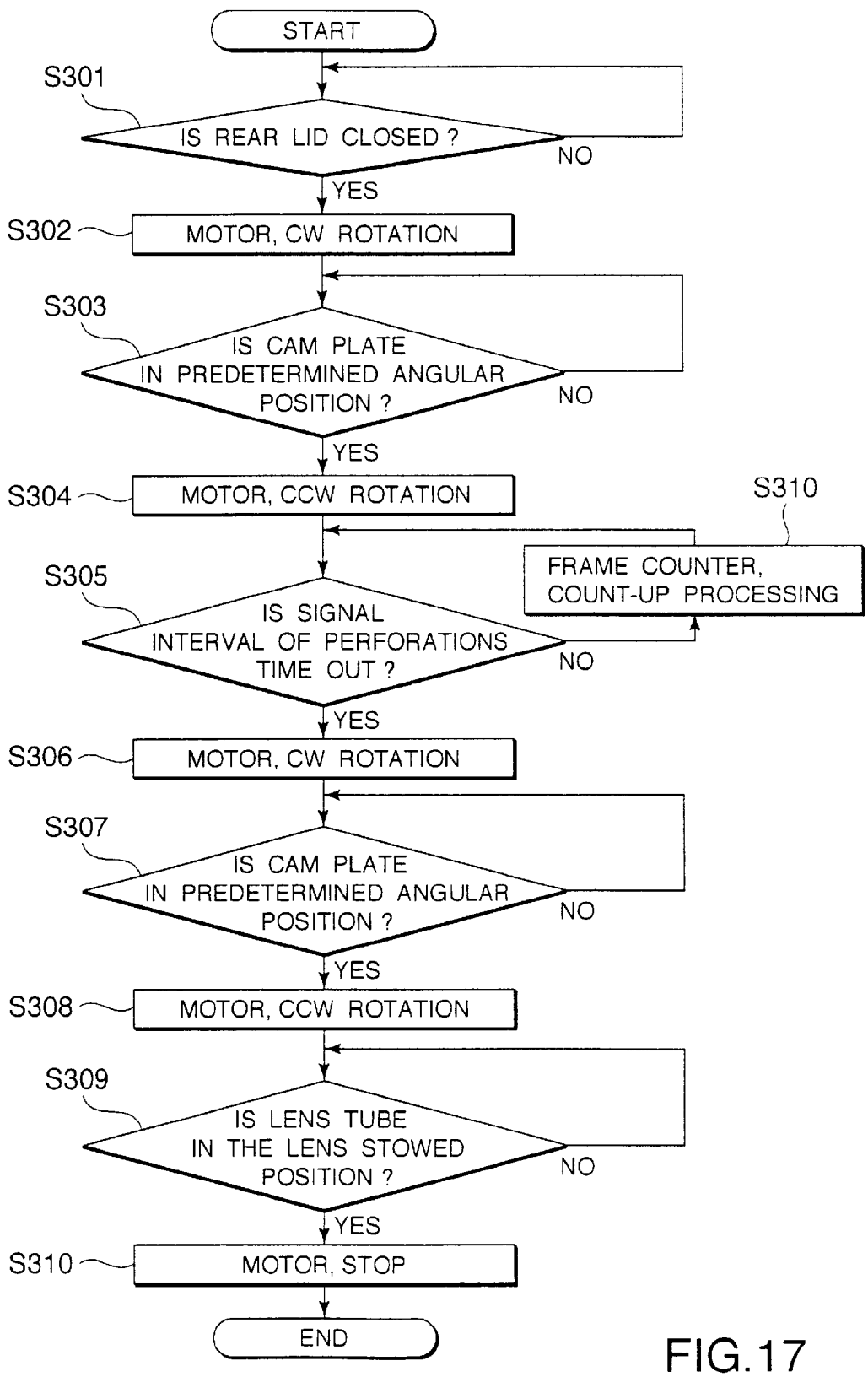
FIG. 17 is a flow chart showing the procedure of the control performed by a CPU within a camera in which the mechanical power switching apparatus according to one embodiment of the present invention is incorporated, said flow chart being used for explaining the control of the pre-wind operation.

The control procedure executed by the CPU 112 in performing the pre-wind operation described above will now be described with reference to the flow chart shown in FIG. 17. Specifically, FIG. 17 schematically shows the program executed by the CPU 112 when it is detected that the rear lid (not shown) has been opened.

In step S301, the CPU 112 monitors the output signal generated from a rear lid switch 120 and judges whether or not the rear lid has been closed. If the judgment in step S301 is negative, i.e., if it is judged in step S301 that the rear lid is not closed, the CPU 112 continues to perform the judging operation in step S301. If the judgment is positive, however, the operation proceeds to step S302.

In step S302, the CPU 112 outputs a signal to the driver 114 shown in FIG. 4 to permit the motor 20 to be rotated in the clockwise direction. In step S303, the CPU 112 obtains the rotating position of the cam 12a and judges whether or not the engagement between the planetary arm engaging portion 70a and the planetary arm 38 is released on the basis of the signals generated from the photo-interrupter 108 and the light receiving element 106r. If the judgment in step S303 is negative, the CPU 112 continues to perform the judgment in step S303. In step S303, the CPU 112 judges whether or not the cam plate 12 is under the state shown in FIG. 14.

In step S304, the CPU 112 once stops the motor 20 and, then, outputs a signal to rotate the motor 20 in the counterclockwise direction to the driver 114. In this step, the planetary arm 38 is rotated in the counterclockwise direction, and the planetary gear 44 is meshed with the idle gear 64 so as to form the state shown in FIG. 15.

In step S305, the CPU 112 detects the pulse signals generated from the photo-reflector 110, counts the perforations of the photographic film and, at the same time, measures the generating period of the pulse signals. If the judgment in step S305 is negative, the operation of the CPU 112 is branched to step S310. In step S310, the CPU 112 performs the increment (count up) processing of the frame counter (remaining number of frames) every time the number of pulse signals detected in step S305 reaches 8. After the processing in step S310, the operation of the CPU 112 is returned back to step S305.

In step S306, the CPU 112 outputs a signal to rotate the motor in the clockwise direction to the driver 114. In the next step S307, the CPU 112 obtains the rotating position of the cam 12a and judges whether or not the planetary arm engaging portion 70a is engaged with the rotary edge 38a of the planetary arm 38 on the basis of the signals generated from the photo-interrupter 108 and the light receiving element 106r. If the judgment in step S307 is negative, the CPU 112 repeats the judgment in step S307. In step S307, the CPU 112 judges whether or not the cam plate 12 is under the state shown in FIG. 16.

In step S308, the CPU 112 once stops the motor 20 and, then, outputs a signal to rotate the motor 20 in the clockwise direction to the driver 114. In step S309, the CPU 112 obtains the rotary position of the cam 12a and judges whether or not the lens barrel is in the lens stowed position on the basis of the signals outputted from the photo-interrupter 108 and the light receiving element 106r. If the judgment in step S309 is negative, the CPU 112 continues to perform the judgment in step S309. If the judgment in step S309 is positive, however, the operation proceeds to step S310.

In step S310, the CPU 112 outputs a signal to stop the motor 20 to the driver 114 so as to finish the pre-wind processing.

As described above, according to the mechanical power switching apparatus according to the embodiment of the present invention, it is possible to switch the mechanical power generated from a single actuator to the use for the zoom operation of the optical system and for other operations without using in combination another actuator such as a plunger.

The embodiment described above covers the case where the mechanical power generated from the motor 20 is switched for use for the zoom function of the photographing system and for use in the film feeding operation (one-frame wind up/pre-wind operation). However, the present invention is not limited to the particular embodiment. For example, it is conceivable to use a variable focal length optical system that is constructed such that the lens is switched to a turret type or some of the lens elements are movable onto or outside an optical axis of the photographing optical system in addition to the type that the synthetic focal length can be changed by changing the air distance among a plurality of lens elements. It is also possible to apply the technical idea of the present invention to not only the photographing optical system described above but also to various optical systems such as the observation optical system, the light emitting optical system and the illuminating optical system.

Also, in the embodiment described above, the mechanical power switching apparatus of the present invention is incorporated in a camera using a so-called "silver salt film". However, it is possible to incorporate the mechanical power switching apparatus of the present invention in, for example, a digital still camera, and a video camera as well as in scanners and other optical appliances. In this case, various uses other than the zoom motion of the optical system are conceivable including, for example, the opening/closing driving of a lens barrier in place of the film feeding, the inject mechanism and loading mechanism of a cassette tape, and the feeding mechanism of the reading original. Also, it is possible for the number of kinds of uses other than the zoom motion of the optical system to be one as required or more than one.

Further, in the embodiment of the present invention described above, the transmission gear 46 in mesh with the planetary gear 44 is constructed to transmit the mechanical power to the next gear via the worm gear 46b. In this case, if the leading angle of the worm gear 46b is made smaller than a so-called "angle of friction" (=$\tan^{-1}(\mu)$, where $\mu$ represents the friction coefficient between the worm gear 46b and the worm wheel 48a), it is possible to prevent the lens barrel from being moved inadvertently while the mechanical power is being switched to use for the film feeding. The particular effect is made prominent particularly where such a reversion preventing mechanism is mounted to a member that is exposed to the outside and is likely to be touched by the hand such as a lens barrel.

It is possible for the reversion preventing mechanism to be formed of a combination of a ratchet gear and an engaging claw in addition to a combination of a worm gear and a worm wheel. In this case, where the reversion preventing mechanism is driven by a motor, it is desirable to prevent the engaging claw from being detached so as to inhibit the operation and, when the ratchet gear begins to be rotated by the force transmitted from the outside, it is desirable to allow the engaging claw to inhibit the rotation of the ratchet gear.

Alternatively, it is possible to mount a driven apparatus located on the rear side of the planetary gear mechanism 40 constituting the transmission switching mechanism or an apparatus capable of detecting the movement of the driven apparatus, like the combination of the light receiving element 106r and the cam 12a in the embodiment of the present invention described above. In this case, even if the mechanism for one use is moved while the mechanical power is being switched to the use for driving the mechanism for the other use, it is possible to perform an appropriate recovery operation by detecting the movement of the particular mechanism by, for example, the CPU.

In the embodiment described above, the transmission gear 46 consists of a combination of the spur gear 46a and the worm gear 46b, and the transmission gear 48 consists of a combination of the worm wheel 48a and the spur gear 48b. By the combination of the worm gear 46b and the worm wheel 48a, the direction of the rotary shaft of the elements for transmitting the mechanical power can be changed easily. To be more specific, in the embodiment of the present invention, the extending direction of the rotary shaft is changed by the worm gear 46a and the worm wheel 48a so as to conform with the situation that the extending direction of the rotary shaft for the feeding of the photographic film differs from that for the driving of the zoom optical system. The particular construction of the present invention permits increasing the degree of freedom in the arrangement of the elements for transmitting the mechanical power, with the result that the free space within the apparatus can be effectively utilized.

The direction of the rotary shaft of the element for transmitting the mechanical power can also be changed by a combination of a crown gear and a spur gear, a pair of umbrella gears, a pair of screw gears, a combination of a pinion gear and a rack rear, and a combination of two pulleys and a rubber belt in addition to the combination of the worm gear and the worm wheel described above.

It should be noted that the position in the front-rear direction of the movable barrel 4 strictly corresponds to the rotary angular position of the cam plate 12, making it possible to know the position in the front-rear position of the movable barrel 4, i.e., the position of the zoom lens barrel, on the basis of the signal generated from the light receiving element 106r. In other words, the cam plate 12, the light emitting element 106e, and the light receiving element 106r collectively form an encoder, which can be used for a plurality of purposes. It is possible to decrease the number of electric elements, the arranging space of the electric elements, and the number of ports of the CPU by using a single encoder for a plurality of purposes such as the detection of the position of the zoom optical system and the detection of the state of the transmission switching mechanism.

The apparatus of the embodiment described above comprises the first encoder formed of the cam plate 12, the light emitting element 106e and the light receiving element 106r and the second encoder formed of the encoder plate 24 and the photo-interrupter 108. Since the encoder plate 24 is mounted to the rotary shaft of the motor 20, the second encoder exhibits a resolution higher than that of the first encoder in view of the objects of the position detection of the zoom optical system and the state detection of the transmission switching mechanism. The position detection of the zoom optical system and the state detection of the transmission switching mechanism can be performed with a higher accuracy by utilizing the characteristics pointed out above. For example, the position detection and the state detection noted above can be performed with a higher accuracy, if the rough position is detected first on the basis of the output signal of the first encoder having a relatively low resolution, followed by detecting the finer position on the basis of the output signal of the second encoder having a relatively high resolution. In this case, the position can be determined more accurately by detecting first the output signal of the first encoder, followed by detecting the signal from the second encoder, i.e., the number of pulses in this embodiment, so as to control the operation of the motor 20.

Incidentally, a difference in the accuracy of the position determination takes place in some cases among the individual cameras depending on the nonuniformity in the processing accuracy of the parts of the camera and the nonuniformity in the mounting positions of the light emitting element 106e and the light receiving element 106r. In such a case, it is advisable to record in the EEPROM 150 an adjustment constant for eliminating the differences among the individual cameras. To be more specific, when the signals from the second encoder are counted after detection of the output signal of the first encoder, the CPU 112 detects that the predetermined number of pulses has been reached so as to perform the positioning control of the zoom optical system and the state control of the transmission switching mechanism, on the basis of the data recorded in the EEPROM. As a result, it is possible to decrease the difference among the individual cameras caused by the nonuniformity in the processing accuracy of the parts of the camera and in the accuracy of the mounting positions of the parts of the camera.

In the embodiment described above, the lenses G1, G2 and G3 constitute the optical element, the photographing optical system shown in FIG. 2, etc. constitutes the zoom optical system, the movable barrel 4 (lens barrel) constitutes the holding mechanism, the motor 20 constitutes the driving source and the actuator, and each of the planetary gear mechanism 40, the cam 12a, the engaging levers 70, 78, and the joining lever 74 constitutes the transmission switching mechanism.

What is claimed is:

1. A mechanical power switching apparatus, comprising:
   a zoom optical system in which the focal length is changed in accordance with movement of optical elements;
   a holding mechanism for movably holding said optical elements;
   a photographic film feeding mechanism for feeding a loaded photographic film;
   a driving source for selectively supplying a mechanical power to said holding mechanism and to said photographic film feeding mechanism; and
   a transmission switching mechanism which switches the transmission of said mechanical power from said holding mechanism to said photographic film feeding mechanism by reversing a direction of said mechanical power from said driving source during the course of change in the focal length of said zoom optical system from a value of 1 to another value.

2. The mechanical power switching apparatus according to claim 1, wherein said transmission switching mechanism comprises:
   a mechanical power transmitting member driven by said driving source thereby to be movable in accordance with the direction of the mechanical power of said driving source between a first position at which the mechanical power of said driving source is transmitted to said holding mechanism and a second position at which the mechanical power of said driving source is transmitted to said photographic film feeding mechanism;
   a first engaging member which enables said mechanical power transmitting member to be engaged in said first position;
   a second engaging member which enables said mechanical power transmitting member to be engaged in said second position; and
   a movement control mechanism moved in accordance with the movement of said holding mechanism caused by said driving source which enables said first engaging member to be brought into contact with and moved away from said mechanical power transmitting member.

3. The mechanical power switching apparatus according to claim 2, further comprising a controller which controls the direction of the mechanical power of said driving source such that the mechanical power of said driving source is transmitted at a predetermined timing to said holding mechanism or to said photographic film feeding mechanism.

4. The mechanical power switching apparatus according to claim 2, wherein said mechanical power transmitting member comprises a planetary gear mechanism.

5. The mechanical power switching apparatus according to claim 2, wherein said movement control mechanism comprises:
   a cam plate that is rotated in accordance with the movement of said holding mechanism caused by said driving source; and
   a cam mounted to a periphery of said cam plate and pushing said first engaging member in accordance with rotation of the cam plate thereby to detach said first engaging member from said mechanical power transmitting member.

6. The mechanical power switching apparatus according to claim 3, wherein said mechanical power transmitting member comprises a planetary arm, and said mechanical power switching mechanism further comprises a position detector which detects whether or not said planetary arm is in a position of being engaged with said first engaging member, said position detector also detecting the position of said holding member and said controller controlling the direction of the mechanical power of said driving source based on the result of detection of said position detector.

7. The mechanical power switching mechanism according to claim 6, wherein said position detector further comprises a first position detecting device having a relatively low resolution and a second position detecting device having a relatively high resolution, and said controller judges the state of said mechanical power switching mechanism by detecting a change of the signal detected by said second position detecting device to a predetermined value after detection of a change of the signal by said first position detecting device to a predetermined value.

8. A camera comprising:
   a zoom photographing optical system in which the focal length is changed in accordance with movement of optical elements;
   a lens barrel movably holding said optical elements;
   a photographic film loading portion which loads a photographic film;
   a photographic film feeding mechanism which feeds a photographic film which is loaded in said photographic loading portion;
   an actuator which supplies a mechanical power to said lens barrel; and
   a transmission switching mechanism which switches the transmission of said mechanical power from said lens barrel to said photographic film feeding mechanism by reversing a direction of said mechanical power from said actuator during the course of the change in the focal length of said zoom photographing optical system from a value of 1 to another larger value.

9. The camera according to claim 8, wherein said transmission switching mechanism comprises:
   a mechanical power transmitting member driven by said actuator thereby to be movable in accordance with the direction of the mechanical power of said actuator between a first position at which the mechanical power of said actuator is transmitted to said lens barrel and a second position at which the mechanical power of said actuator is transmitted to said photographic film feeding mechanism;

a first engaging member which enables said mechanical power transmitting member to be engaged in said first position;

a second engaging member which enables said mechanical power transmitting member to be engaged in said second position; and a movement control mechanism moved in accordance with the movement of said lens barrel caused by said actuator which enables said first engaging member to be brought into contact with and moved away from said mechanical power transmitting member.

10. The camera according to claim 9, further comprising control a controller which controls the direction of the mechanical power of said actuator such that the mechanical power of said actuator is transmitted at a predetermined timing to said lens barrel or to said photographic film feeding mechanism.

11. The camera according to claim 10, wherein said mechanical power transmitting member further comprises a planetary arm, and said mechanical power switching mechanism further comprises a position detector which detects whether or not said planetary arm is in a position to be engaged with said first engaging member, said position detector also performing the function of detecting the position of said lens barrel, and said controller controls the direction of the mechanical power of said driving source based on the result of detection of said position detecting means.

12. The camera according to claim 11, wherein said position detector further comprises a first position detecting device having a relatively low resolution and a second position detecting device having a relatively high resolution, and said controller judges the state of said mechanical power switching mechanism by detecting a change of the signal detected by said second position detecting device to a predetermined value after detection of a change of the signal detected by said first position detecting device to a predetermined value.

13. The camera according to claim 9, wherein said mechanical power transmitting member comprises a planetary gear mechanism.

14. The camera according to claim 9, wherein said movement control mechanism comprises:

a cam plate that is rotated in accordance with the movement of said lens barrel caused by said actuator; and a cam mounted to a periphery of said cam plate and pushing said first engaging member in accordance with rotation of the cam plate thereby to detach said first engaging member from said mechanical power transmitting member.

* * * * *